(12) United States Patent  
Farrar et al.

(10) Patent No.: US 7,404,484 B2
(45) Date of Patent: Jul. 29, 2008

(54) SECURITY DEVICE FOR INFORMATION STORAGE MEDIA

(75) Inventors: Peter Antony Farrar, Menston (GB); Anthony Henry Joseph Fraser, Ketton (GB); Stefan Alexander Pijanowski, Oundle (GB); Robert Johnston, Geddington (GB)

(73) Assignee: Meadwestvaco Corporation, Glen Allen, VA (US)

( * ) Notice: Subject to any disclaimer, the term of this patent is extended or adjusted under 35 U.S.C. 154(b) by 0 days.

(21) Appl. No.: 10/416,767

(22) PCT Filed: Nov. 12, 2001

(86) PCT No.: PCT/GB01/05000

§ 371 (c)(1),
(2), (4) Date: Nov. 7, 2003

(87) PCT Pub. No.: WO02/39451

PCT Pub. Date: May 16, 2002

(65) Prior Publication Data

US 2004/0123311 A1    Jun. 24, 2004

(30) Foreign Application Priority Data

Nov. 10, 2000 (GB) ................. 0027553.7
Nov. 30, 2000 (GB) ................. 0029223.5
Mar. 28, 2001 (GB) ................. 0107727.0
Mar. 28, 2001 (GB) ................. 0107728.8
Apr. 26, 2001 (GB) ................. 0110245.8
Oct. 10, 2001 (GB) ................. 0124328.6

(51) Int. Cl.
*B65D 85/57* (2006.01)
*E05B 65/00* (2006.01)

(52) U.S. Cl. .......... 206/308.1; 70/57.1; 70/63; 206/1.5; 206/387.11; 206/807
(58) Field of Classification Search ... 206/308.1–308.2, 206/309–313, 387.11, 1.5, 807; 70/57.1, 70/58, 63
See application file for complete search history.

(56) References Cited

U.S. PATENT DOCUMENTS

| 1,510,632 A | 10/1924 | Nutry |
| 3,685,684 A | 8/1972 | Schindler |
| 4,285,429 A | 8/1981 | MacTavish |

(Continued)

FOREIGN PATENT DOCUMENTS

EP    0616103 A1    9/1994

(Continued)

*Primary Examiner*—Bryon P Gehman

(57) ABSTRACT

Apparatus (19) for holding information storage media, such as a CD or DVD, in combination with a releasable security member (8) insertable into the apparatus for inhibiting removal of the storage media from the apparatus, e.g. by inhibiting access to the storage media by locking the apparatus in a closed configuration and/or by locking the storage media to the apparatus. The apparatus is adapted, e.g. by knowing one or more slots (12, 24) therein, to receive part of the security member therein and the security has at least one projection (9A, 10A) for inserting into the apparatus, e.g. through the slot (12, 24). Modification t the apparatus to enable it to receive a security member are described as well as different types of security members. Apparatus for releasing the security member from the apparatus holding the storage media is also described.

18 Claims, 31 Drawing Sheets

U.S. PATENT DOCUMENTS

| | | | |
|---|---|---|---|
| 4,425,999 A * | 1/1984 | MacDonald et al. | 206/1.5 |
| 4,466,540 A | 8/1984 | Lotrous et al. | |
| 4,469,225 A | 9/1984 | Takahashi | |
| 4,589,549 A | 5/1986 | Hehn | |
| 4,658,955 A | 4/1987 | Eichner | |
| 4,685,558 A | 8/1987 | Filiz et al. | |
| 4,750,618 A | 6/1988 | Schubert | |
| 4,966,020 A | 10/1990 | Fotheringham et al. | |
| 5,031,756 A * | 7/1991 | Buzzard et al. | 206/308.2 |
| 5,039,982 A * | 8/1991 | Bruhwiler | 206/1.5 |
| 5,147,034 A | 9/1992 | Broadhead et al. | |
| 5,209,086 A | 5/1993 | Bruhwiler | |
| 5,375,712 A | 12/1994 | Weisburn | |
| 5,460,266 A | 10/1995 | Mundorf et al. | |
| 5,524,752 A | 6/1996 | Mazzucchelli | |
| 5,588,315 A | 12/1996 | Holmgren | |
| 5,597,068 A | 1/1997 | Weisburn | |
| 5,598,728 A | 2/1997 | Lax | |
| 5,636,535 A | 6/1997 | Tomoharu | |
| 5,680,782 A | 10/1997 | Hiroaki et al. | |
| 5,718,332 A | 2/1998 | Tachibana | |
| 5,760,689 A | 6/1998 | Holmgren | |
| 5,762,187 A | 6/1998 | Belden et al. | |
| 5,768,922 A | 6/1998 | Lax | |
| 5,782,350 A | 7/1998 | Weisburn et al. | |
| 5,823,341 A | 10/1998 | Nakasuji | |
| 5,850,752 A | 12/1998 | Lax | |
| 5,882,052 A | 3/1999 | Whitehead | |
| 5,901,840 A | 5/1999 | Nakasuji | |
| 5,904,246 A | 5/1999 | Weisburn et al. | |
| 5,934,114 A | 8/1999 | Weisburn et al. | |
| 5,944,185 A * | 8/1999 | Burdett et al. | 206/387.11 |
| 5,988,376 A | 11/1999 | Lax | |
| 6,082,156 A | 7/2000 | Bin | |
| 6,135,280 A | 10/2000 | Burdett et al. | |
| 6,155,087 A | 12/2000 | Necchi | |
| 6,182,480 B1 * | 2/2001 | Kim | 70/57.1 |
| 6,202,454 B1 | 3/2001 | Nakasuji | |
| 6,283,281 B1 * | 9/2001 | Pandolph et al. | 206/308.1 |
| 6,296,115 B1 | 10/2001 | Kurosawa et al. | |
| 6,336,554 B1 | 1/2002 | Bruhwiler | |
| 6,374,648 B1 | 4/2002 | Mitsuyama | |
| 6,422,387 B1 | 7/2002 | Sedon et al. | |
| 6,430,976 B1 | 8/2002 | Mitsuyama | |
| 6,450,331 B2 * | 9/2002 | Pandolph et al. | 206/308.1 |
| 6,467,318 B1 | 10/2002 | Gattiker | |
| 6,474,470 B2 * | 11/2002 | Byrne et al. | 206/308.2 |
| 6,497,125 B1 | 12/2002 | Necchi | |
| 6,516,639 B1 | 2/2003 | Margetts et al. | |
| 6,561,347 B1 | 5/2003 | Lax | |
| D477,767 S | 7/2003 | Burdett et al. | |
| 6,598,742 B1 | 7/2003 | Belden et al. | |
| D477,983 S | 8/2003 | Burdett et al. | |
| 6,601,414 B1 | 8/2003 | Chang | |
| 6,601,701 B1 * | 8/2003 | Belden et al. | 206/387.11 |
| 6,601,702 B2 * | 8/2003 | Byrne et al. | 206/387.11 |
| 6,619,079 B2 | 9/2003 | Cheung | |
| 6,672,455 B2 | 1/2004 | Belden et al. | |
| 6,732,861 B2 | 5/2004 | Aarts | |
| 6,851,554 B2 * | 2/2005 | Byrne et al. | 206/308.2 |
| 6,880,372 B2 | 4/2005 | Kim | |
| 6,886,691 B2 * | 5/2005 | Burdett et al. | 70/57.1 |
| 6,926,164 B1 | 8/2005 | Broadhead et al. | |
| 6,931,895 B1 * | 8/2005 | Ahn | 70/57.1 |
| 2002/0003095 A1 | 1/2002 | Jaeb et al. | |
| 2003/0111367 A1 | 6/2003 | Lax et al. | |
| 2004/129587 A1 | 7/2004 | Lax et al. | |
| 2004/0187530 A1 | 9/2004 | Lax et al. | |
| 2005/0098453 A1 | 5/2005 | Lax | |

FOREIGN PATENT DOCUMENTS

| | | | |
|---|---|---|---|
| EP | 0729897 A1 | | 9/1996 |
| FR | 2628717 A1 | | 9/1989 |
| FR | 2711311 A1 | | 4/1995 |
| FR | 2715817 A1 | | 8/1995 |
| GB | 2351277 A | | 12/2000 |
| JP | 2000-191078 | | 7/2000 |
| JP | 2000-219288 | | 8/2000 |
| WO | WO 90/04548 | * | 5/1990 |
| WO | WO9300495 | | 1/1993 |
| WO | WO0017877 A2 | | 3/2000 |
| WO | WO0141146 | | 6/2001 |

* cited by examiner

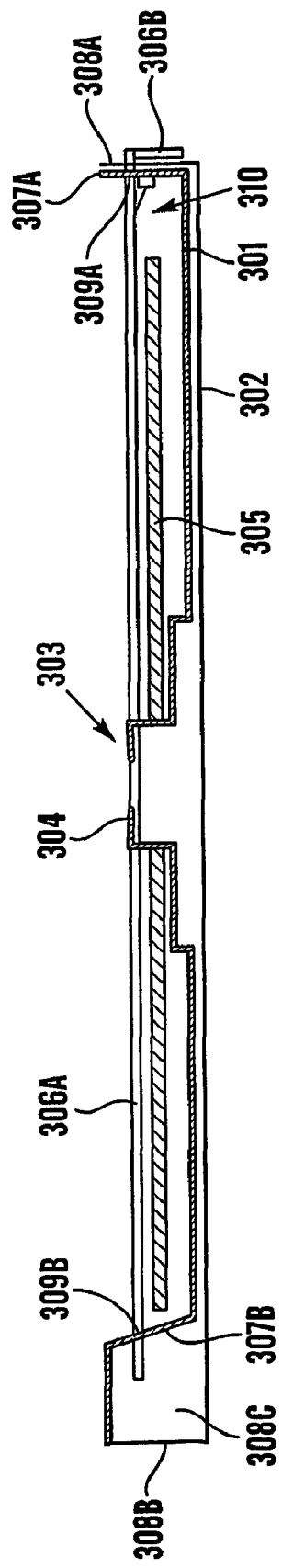
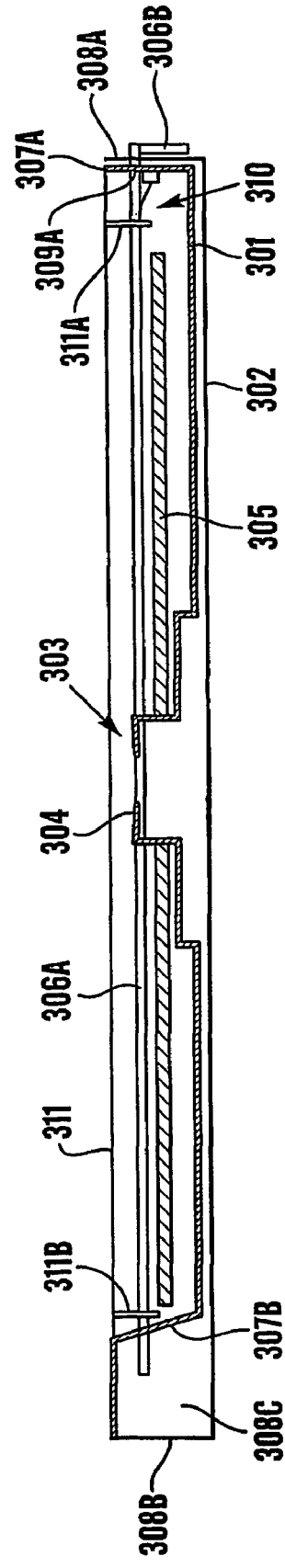
Fig.28
Fig.29

SECURITY DEVICE FOR INFORMATION STORAGE MEDIA

This invention relates to apparatus and cases for holding and enclosing information storage media and to security devices for use therewith to prevent or deter theft. It also relates to release devices for releasing such security devices.

The invention is particularly concerned with apparatus and cases for holding disk shaped data carriers, for example CDs and DVDs, but may be applicable, to other forms of information storage media.

Various types of containers are known for holding CDs or DVDs. Many CDs are housed in so called "jewel boxes" which comprise a plastic tray on which the CD is mounted and the tray is installed within a clear plastic box comprising a base portion and a lid portion hinged thereto. More recently there have been advances in the technology, particularly for housing DVDs, which are described in U.S. Pat. No. 5,788,068 and WO97/41563, the disclosures of which are incorporated herein. Following the success of these products, a variety of other types of case have been introduced into the market.

A problem encountered with such known apparatus is the removal and theft of a CD or DVD from the apparatus within a store selling such products. The disk holder is usually provided within a container which is provided with a security tag which triggers an alarm if the container is taken out of the store without the tag first being removed or rendered inactive by staff in the store. The container may also be provided with a clear plastic wrapper which has to be removed before the container can be opened. However, it has been found that thieves are able to slit the wrapper along an edge of the container, e.g. the bottom edge, and release the CD or DVD from the disk holder within the container by actuating the release mechanism thereof by pressing this through a side wall of the container. They are then able to remove the CD or DVD from the container by compressing the container so that the side walls bow forming a gap between the two halves thereof so the CD or DVD can be slid out through the slit made in the wrapper. An experienced thief is able to do this whilst pretending to examine the product and slip the CD or DVD into a coat pocket unobserved. They then leave the empty container on the shelf and leave the store with the CD or DVD in their pocket without triggering the alarm system.

There are also other ways thieves can try to avoid the existing security measures taken by stores selling CDs and DVDs. Security tags are often provided on the products and thieves may, for instance, remove or disable these. The term "security tag" is used herein to refer to any form of component which triggers an alarm if taken past a sensor.

For these reasons, many stores only display empty containers and when a customer has made a selection, the staff retrieve the relevant CD or DVD from a secure cupboard or safe and place it in the container for the customer. However, this takes additional time and requires an additional secure storage place for the CDs and DVDs. It also increases the risk that the wrong CD or DVD may be put in the container, especially if the staff are busy. The stores would also prefer for the disks to be held within the boxes on display as this is more appealing to a potential customer than an empty box (and has been shown to significantly increase sales). There is therefore a desire within the trade to be able to display CD or DVD containers with the relevant CD or DVD already held therein; such a practice being known as 'live' storage within the trade.

Prior art devices for increasing the security of such containers tend to be bulky and expensive. One known form of device comprises a "keeper" in the form of a robust casing or frame which fits around, or partially around, the exterior of the container and is locked in a closed position so it is impossible to open the container without first unlocking and removing the keeper. Such keepers are difficult to handle, substantially increase the size of the product (often increasing the size of the product by 30% or more and so occupying more shelf space). They also detract from the aesthetics of the product, may conceal some of the artwork on the exterior of the container and considerably reduce the attractiveness of the product to a potential customer.

WO97/02569 describes another form of security device in which one edge of the container is inserted into a channel shaped keeper which fits over the edge of the product and extends at least part way over opposite external faces of the container to prevent the container from being opened. Such a keeper is still a relatively complex and expensive item, which adds significantly to the external dimensions of the container, reduces the attractiveness of the container to a potential customer and prevents the container from being stood on its bottom edge. For these reasons, this type of device has not been widely used.

One of the aims of the present invention is thus to enable the security of a live storage container housing a disk-shaped carrier such as a CD or DVD to be improved.

According to a first aspect of the invention, there is provided apparatus for holding information storage media in combination with a releasable security member insertable into the apparatus for inhibiting removal of the storage media from the apparatus, the apparatus being adapted to receive at least part of the security member therein and the security member having at least one projection for inserting into the apparatus.

Many other aspects of the invention are believed to be novel, examples of which are given below:

According to a second aspect of the present invention, there is provided apparatus for holding information storage media comprising a releasable security member for inhibiting removal of the storage media from the apparatus, the security member being retained in a locked position by a snap-fit mechanism actuated as the security member is fitted to the apparatus.

According to a third aspect of the invention there is provided apparatus for holding information storage media comprising a base portion having a holding member to hold the information storage media; a releasable security member insertable into the apparatus to inhibit operation of the holding member; and removable therefrom only following release of a locking device.

According to a fourth aspect of the invention there is provided apparatus for holding information storage media comprising a security tag and a releasable security member for inhibiting removal of the storage media and removal of the security tag from the apparatus.

According to a fifth aspect of the invention there is provided apparatus for holding information storage media comprising a base portion adapted to releasably hold the information storage media; and a releasable security member comprising at least one arm insertable into the apparatus and a part which lies adjacent and substantially parallel with an external face of the apparatus when the arm is positioned within the apparatus.

According to a sixth aspect of the invention there is provided a case for enclosing information storage media comprising a base portion having a holding member to hold the information storage media; a lid portion hinged to the base portion and movable between open and closed positions; and a releasable security member insertable into the case to inhibit operation of the holding member and to hold the case closed.

According to a seventh aspect of the invention there is provided a case for enclosing information storage media comprising a base portion adapted to releasably hold the information storage media; a lid portion hinged to the base portion and movable between open and closed positions; a recess in one edge of the case, the base portion having a first engagement member within the recess and the lid portion having a second engagement member within the recess; and a releasable security member engageable with both the first and second engagement members to hold the case closed.

According to an eighth aspect of the invention there is provided a case for enclosing information storage media comprising a base portion adapted to releasably hold the information storage media; a lid portion movable between an open and closed position; a recess in an outer wall of the casing; a security tag; and a releasable security member which fits within said recess and inhibits removal of the security tag from the case.

According to a ninth aspect of the invention there is provided a case for enclosing information storage media comprising a base portion adapted to releasably hold the information storage media; a lid portion and a hinge portion joining the base portion to the lid portion and a releasable security member slidable through an aperture in an edge of the case opposite the hinge portion to hold the case closed.

According to a tenth aspect of the invention there is provided a case for enclosing information storage media comprising a base portion having a holding member to hold the information storage media; a lid portion movable between open and closed positions; a wrapping around the case; and a releasable security member insertable through the wrapping into the case to inhibit operation of the holding member.

According to an eleventh aspect of the invention there is provided a case for enclosing information storage media comprising a base portion having a holding member to hold the information storage media; a lid portion movable between open and closed positions; a releasable security member within the case to inhibit operation of the holding member and removable therefrom only when the case is open.

According to a twelfth aspect of the invention there is provided a case for enclosing information storage media comprising a base portion, and a lid portion attached to the base portion by a hinge portion, the base and lid portion being shaped to provide a recess in an edge of the case opposite the hinge portion when in the closed position, and a locking device insertable within said recess to engage both the base portion and the lid portion to releasably hold them in the closed position.

According to a thirteenth aspect of the invention there is provided apparatus for holding information storage media comprising a base portion; a security tag; a releasable security member insertable within the base portion; and a locking device for locking the security member to the base portion, wherein access to the security tag is inhibited until the locking device is released to permit the security member to be withdrawn, or at least partially withdrawn, from the base portion.

According to a fourteenth aspect of the invention there is provided a magnetic release device for use with apparatus or a case as above having a releasable security member and a locking device for locking the security member to the apparatus or case.

According to another aspect of the invention, there is provided apparatus for holding information storage media comprising: a security device for inhibiting access to and/or removal of the storage media from the apparatus, the security device having a locked state within the apparatus in which removal of the security device to allow access to the storage media and/or removal of the storage media is prevented and a stable unlocked state within the apparatus in which removal of the security apparatus is permitted.

The security device is thus likely to be a disposable or single use item as, instead of being removed as part of the unlocking process in the store (and re-used in another case), it can be left in the apparatus in the unlocked sate for the customer to remove at a later stage (and then discarded).

The security device preferably inhibits removal of the storage media by inhibiting actuation of releasable holding means holding the media in the apparatus or by blocking movement of the storage media away from the apparatus. Alternatively, or additionally, the device inhibits access to the storage media by inhibiting movement of the lid to the open position or other removal of the lid.

The security device may be insertable into the apparatus and arranged to automatically enter the locked state as it is inserted.

The security device may be switchable from the locked state to the unlocked state by direct mechanical actuation, e.g. by application of a special tool or key.

Alternatively, the security device may be switchable from the locked to the unlocked state by application of a magnetic force.

The security device preferably comprises a latch or snap-fit mechanism which, once the device is inserted into the apparatus, prevents withdrawal of the security device.

The latch may be resiliently biased towards the locked position. When moved to the unlocked position, it may be prevented from returning to the locked position by a catch which holds it in the unlocked position or by an arrangement which releases the resilient force biasing it towards the locked position.

The apparatus may be adapted to hold disc-shaped data carriers such as compact discs (CDs) or DVDs. The security device having the features described herein can be used with a wide variety of such apparatus including CD or DVD cases as described in U.S. Pat. No. 5,788,068 and the well-known version of a CD case known as a "jewel box".

According to another aspect of the invention, there is provided apparatus for holding information storing media adapted to receive a security device for inhibiting access to and/or inhibiting removal of the storage media from the apparatus, the apparatus comprising a base portion and lid portion movable between an open and closed configurations, the base portion and/or lid portion being provided with an aperture in an edge portion thereof through which the security device can be slid in a first direction substantially perpendicular to said edge portion, the lid portion and base portions having inter-engageable parts adjacent said aperture for resisting relative movement between the base portion and lid portion in a direction parallel to said first direction when in the closed configuration.

According to another aspect of the invention, there is provided apparatus for holding information storage media adapted to receive a releasable security device for inhibiting access to and/or inhibiting removal of the storage media from the apparatus, the security device being insertable into the aperture against the resistance of resilient means provided on the apparatus, the arrangement being such that, when the security device is released, said resilient means acts so as to at least partially eject the security device from the apparatus.

According to another aspect of the invention, there is provided apparatus for holding information storage media adapted to receive a security device for inhibiting access to and/or inhibiting removal of the storage media from the apparatus, the security device comprising at least one arm which is slidable through an aperture in an external wall of the apparatus and an end portion which remains external to said wall, said wall being shaped and/or being provided with barriers to inhibit access to edges of said end portion when the security device is installed in the apparatus in its operational position.

According to another aspect of the invention, there is provided apparatus for holding information storage media adapted to receive a security device for inhibiting access to and/or inhibiting removal of the storage media from the apparatus, the security device having a locking mechanism that prevents its removal from the device but permits partial withdrawal of the device from the apparatus.

According to a another aspect of the invention, there is provided apparatus for securely holding information storage media comprising: a base portion; an engaging member on the base portion for engaging the storage media; a releasable security member positionable so as to extend across part of the base portion, whereby, when a storage media is engaged by the engaging member, the security device inhibits movement of the storage media away from the base portion and thus inhibits disengagement of the storage media from the engaging member.

According to another aspect of the invention, there is provided apparatus for securely holding information storage media comprising: a base portion; an engaging member on the base portion for engaging the storage media; a lid portion connected to the base portion and moveable between open and closed positions; a releasable security member positionable so as to extend across the base portion and to engage with the lid portion when in the closed position so as to inhibit movement of the lid portion to the open position or removal of the lid.

The above two aspects may also be used together. Thus, removal of the storage media from the apparatus is inhibited by inhibiting disengagement of the media from the engaging member and/or by inhibiting opening or removal of the lid.

According to another aspect of the invention, there is provided apparatus for securely holding information storage media comprising: a base portion; an engaging member on the base portion for engaging the storage media; a releasable security member positionable so as to extend across part of the base portion, whereby, when a storage media is engaged by the engaging member, the security device inhibits movement of the storage media away from the base portion and thus inhibits disengagement of the storage media from the engaging member.

According to another aspect of the invention, there is provided apparatus for securely holding information storage media comprising: a base portion; an engaging member on the base portion for engaging the storage media; a lid portion connected to the base portion and moveable between open and closed positions; a releasable security member positionable so as to extend across the base portion and to engage with the lid portion when in the closed position so as to inhibit movement of the lid portion to the open position or removal of the lid.

According to another aspect of the invention there is provided a security member adopted for use with apparatus as described herein.

According to another aspect of the invention there is provided apparatus for holding information storage media adopted to receive a security member as described herein.

According to another aspect of the invention, there is provided apparatus for holding information storage media adapted to receive a security device for inhibiting access to and/or inhibiting removal of the storage media from the apparatus.

According to another aspect of the invention, there is provided apparatus for holding information storage media comprising a base portion and a lid portion movable between an open and a closed position, the lid being designed to be opened by means of force applied at a given location to separate it or pivot it away from the base portion, the apparatus having at least one weak portion arranged such that an attempt to open the lid by applying force thereto at some other location tends to cause fracture of part of the lid or base portion rather than opening of the lid portion.

According to another aspect of the invention, there is provided apparatus for releasing a security device held within an information storage media holder by locking means, the apparatus comprising a slot for receiving an edge of the holder and magnetic release means positioned to release the locking means when the holder is inserted into the slot and to hold the security device within the slot as the holder is withdrawn therefrom.

According to another aspect of the invention, there is provided apparatus for holding information storage media in combination with a releasable security member insertable therein, the apparatus comprising a base portion and disk holding means provided thereon, a slot being provided beneath the disk holding means for receiving part of the releasable security member.

Preferred and optional features of the invention will be apparent from the following description and from the subsidiary claims of the specification.

The invention will now be further described, merely by way of example, with reference to the accompanying drawings, in which.

FIG. 9 illustrates a third embodiment of the invention; FIG. 9A shows a plan view of part of apparatus similar to that shown in FIG. 1 with a further embodiment of a releasable security member partially inserted therein with the head thereof shown in cross section; FIG. 9B is an enlarged view of the head when the member is fully inserted and FIGS. 9C and 9D illustrate the use of a key to release the member from the case.

Figure 1:
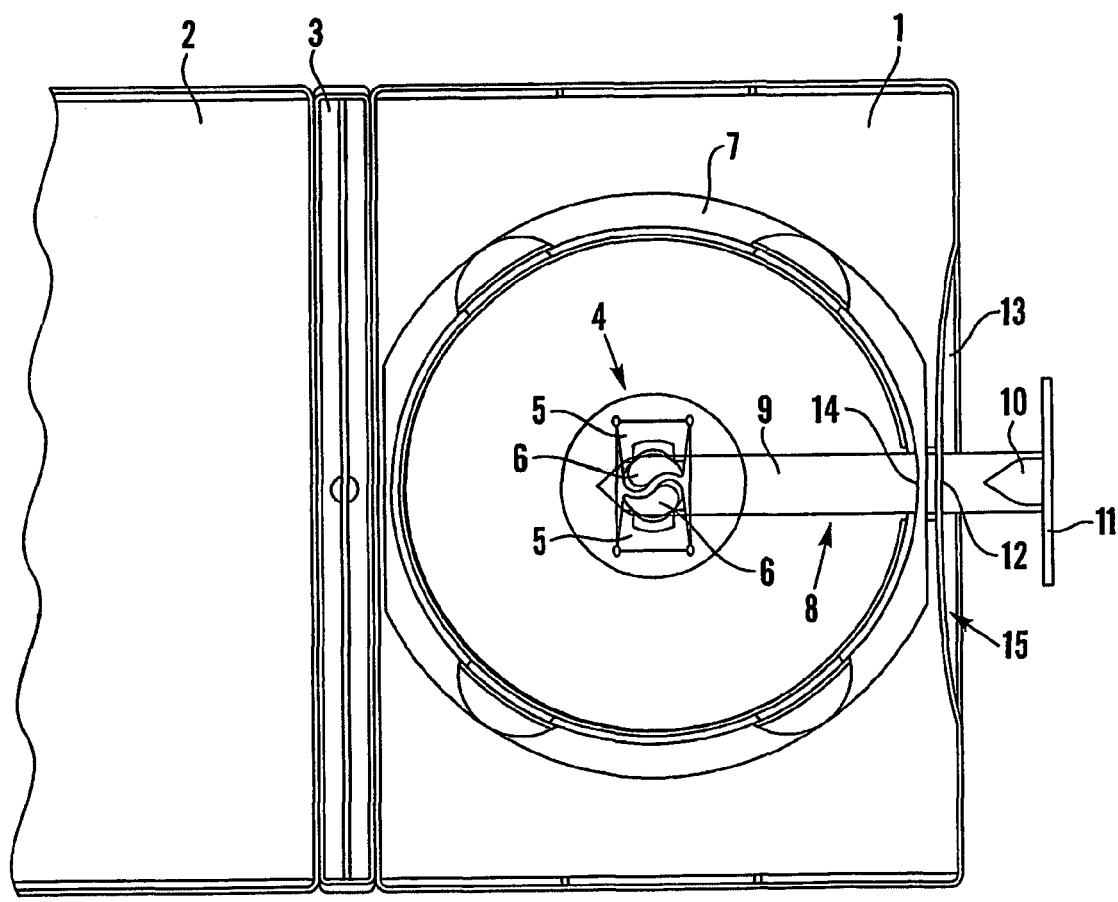
FIG. 1 is a plan view of apparatus for holding a DVD together with a security device according to a first embodiment of the invention.
Figure 10:
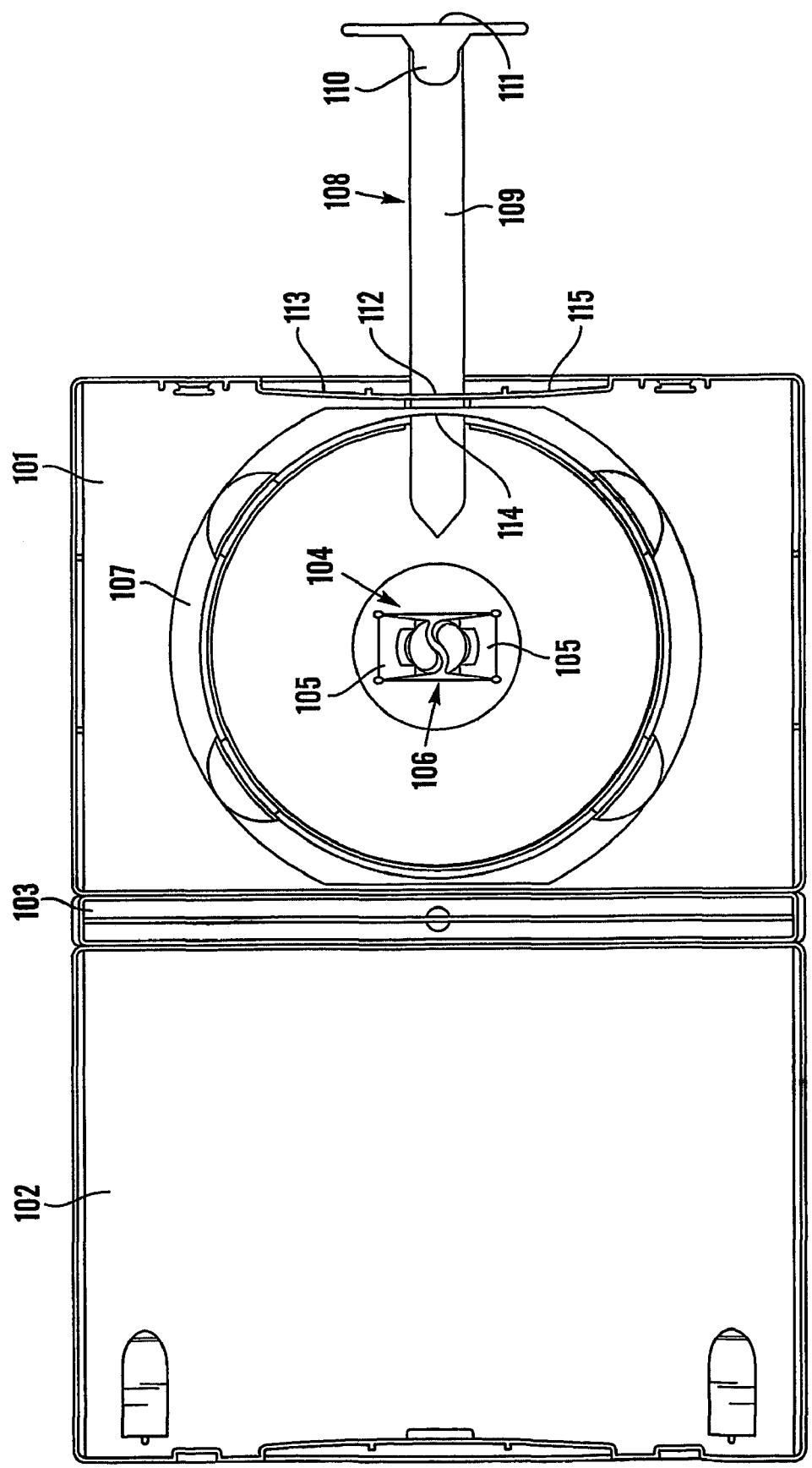
Figure 11:
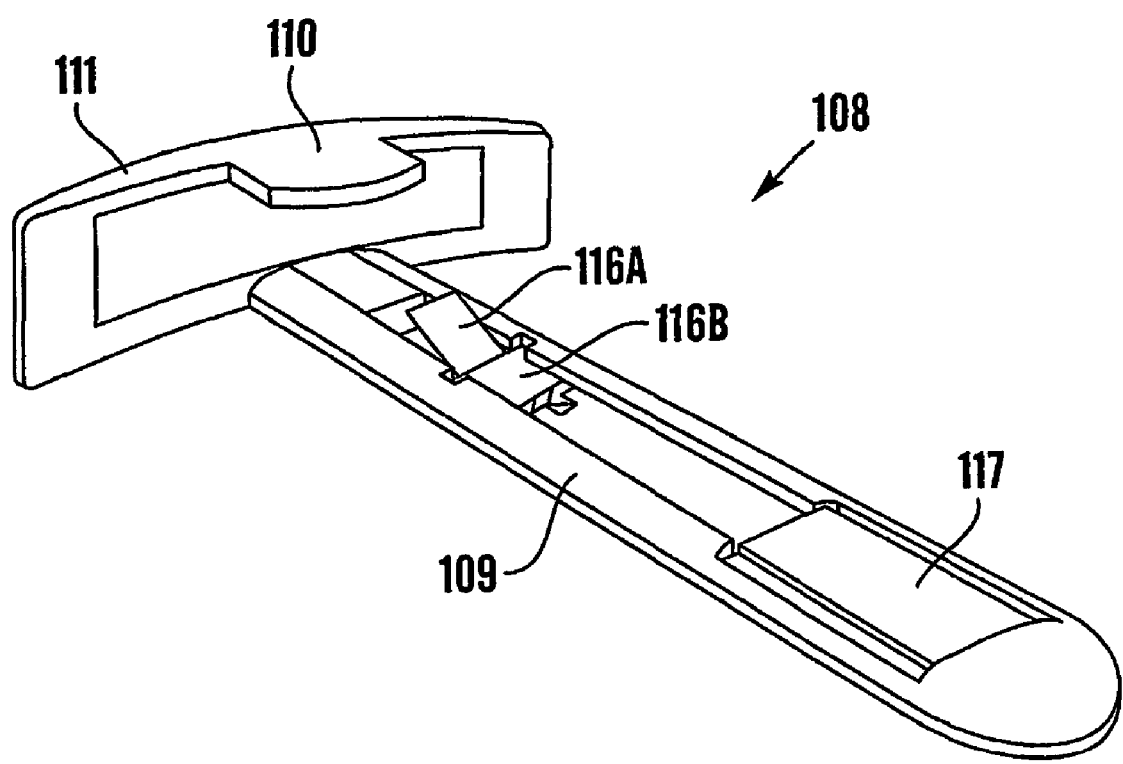
Figure 12:
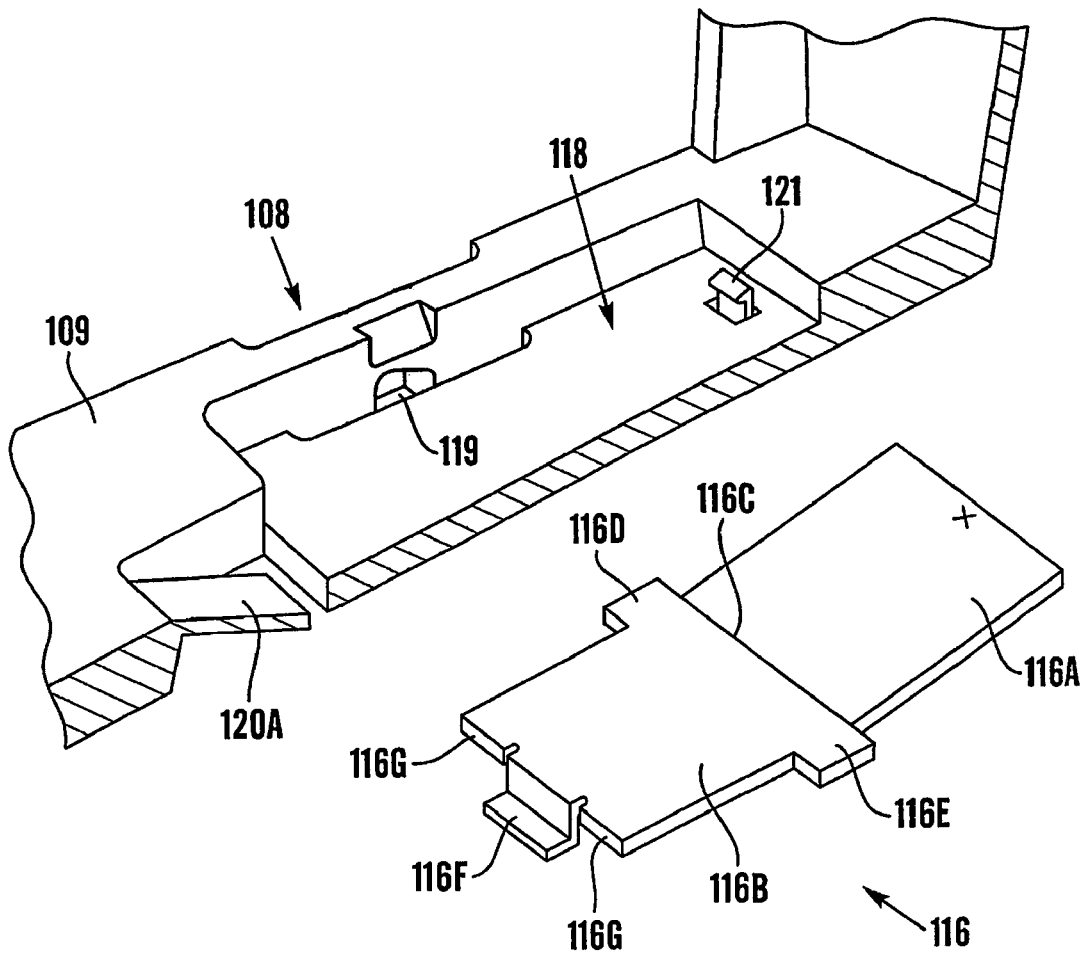
Figure 13:
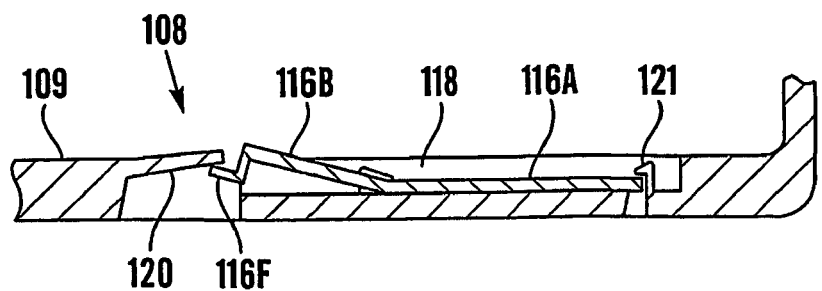
Figure 14:
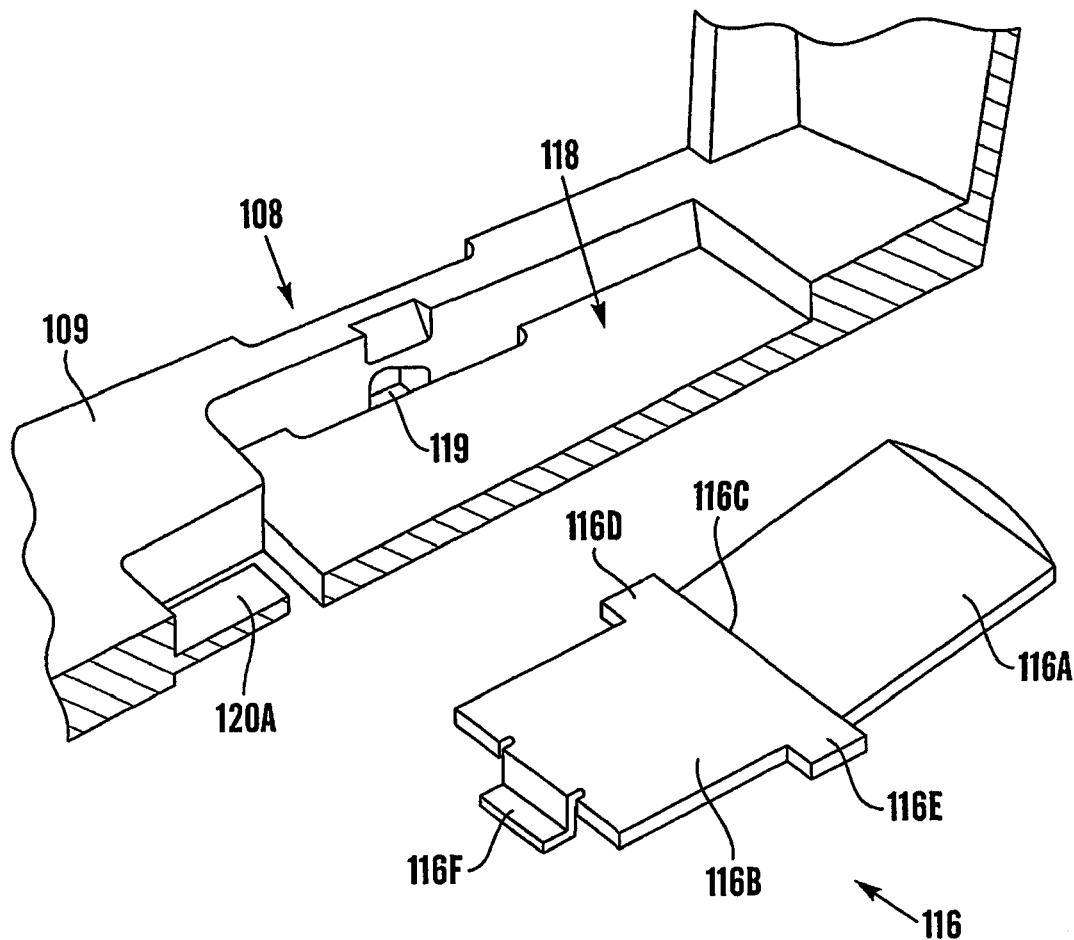
Figure 15:
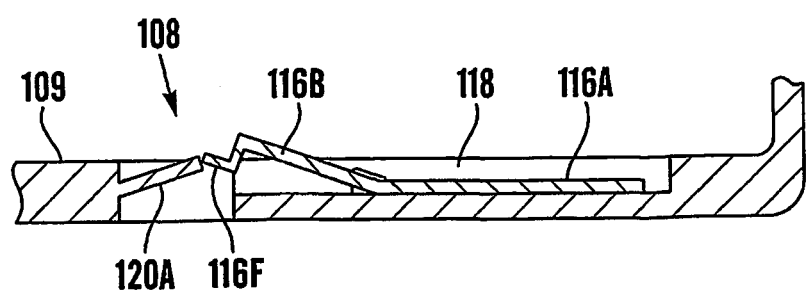

FIG. 10 is a plan view of apparatus for holding a DVD together with a schematic representation of a security device partially inserted therein;

FIG. 11 is a perspective view of another embodiment of a security device for use in the apparatus as shown in FIG. 1;

FIG. 12 is an enlarged view of parts of the device shown in FIG. 11, including a perspective sectional view along a centre line of the device and a perspective view of a metal pivot arm which fits therein;

FIG. 13 is a cross-sectional view along the centre line of the device illustrating how the parts shown in FIG. 12 operate; and FIGS. 14 and 15 correspond to FIGS. 12 and 13 for another embodiment of the security device.

Figure 16:
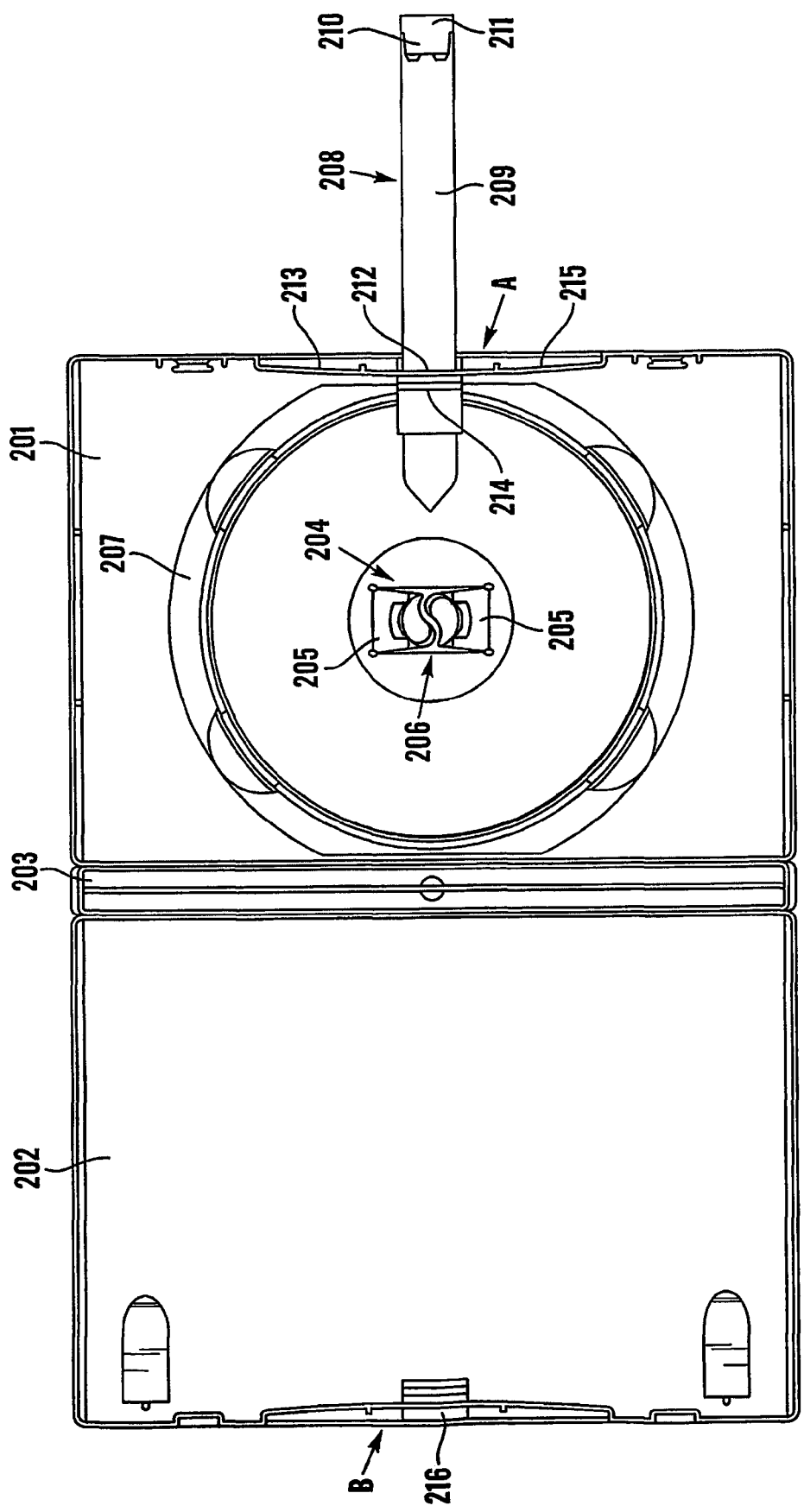
Figure 17:
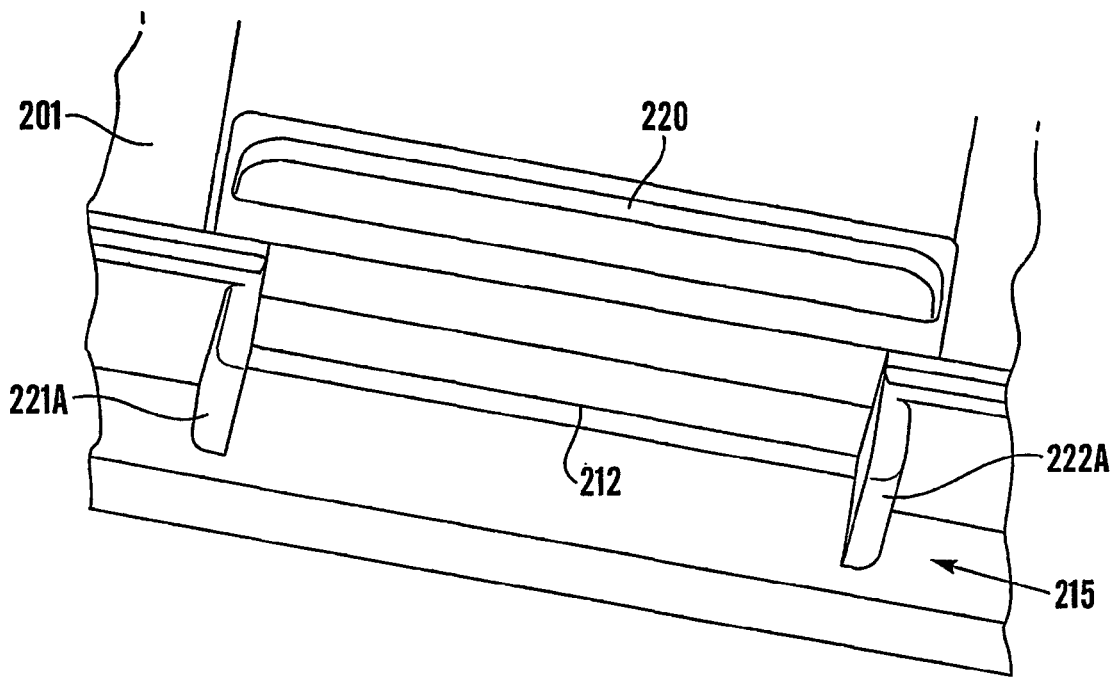
Figure 18:
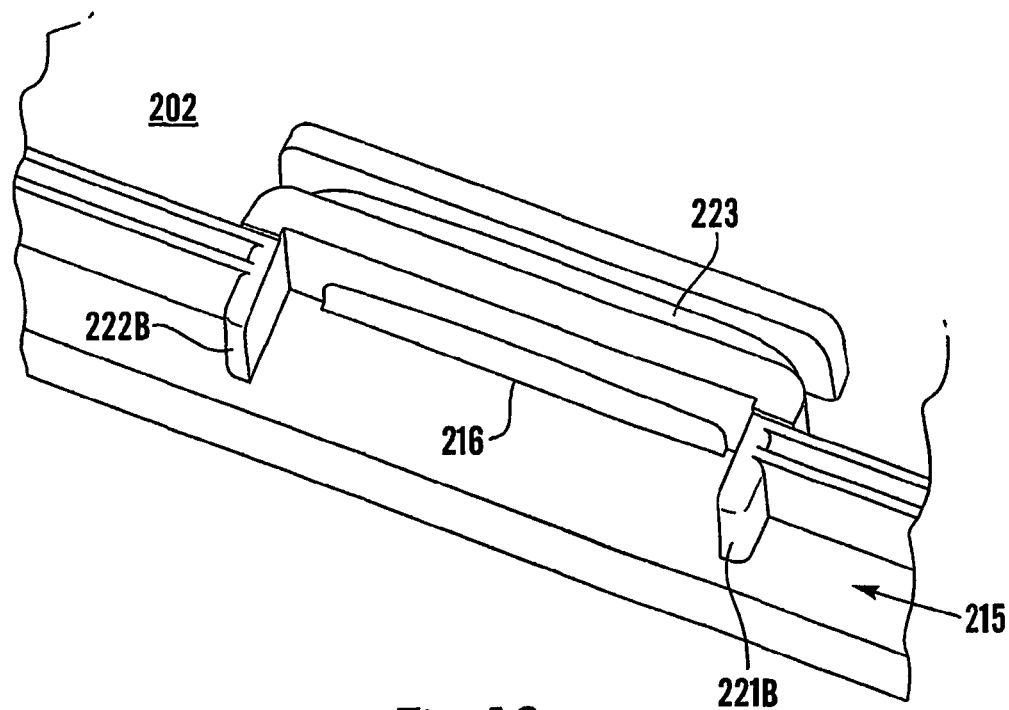
Figure 19A:
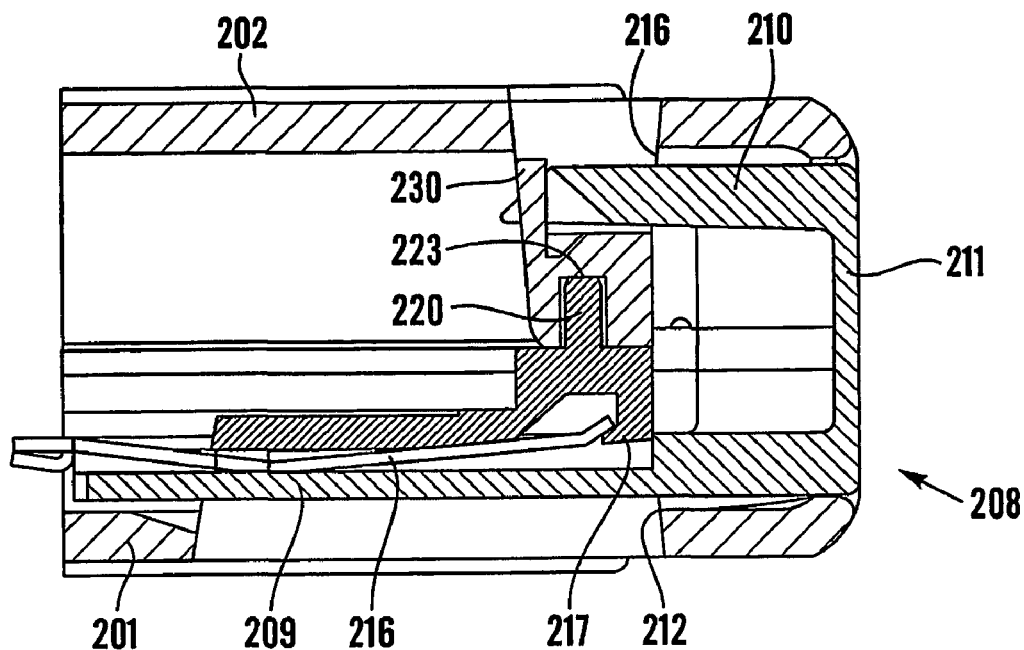
Figure 19B:
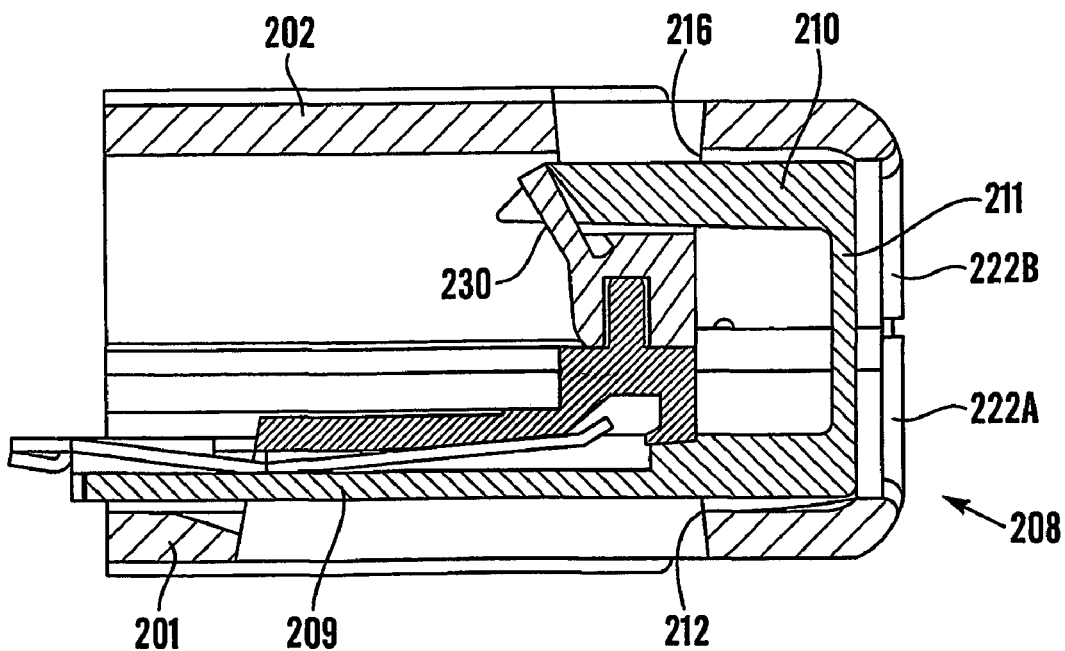
Figure 20:
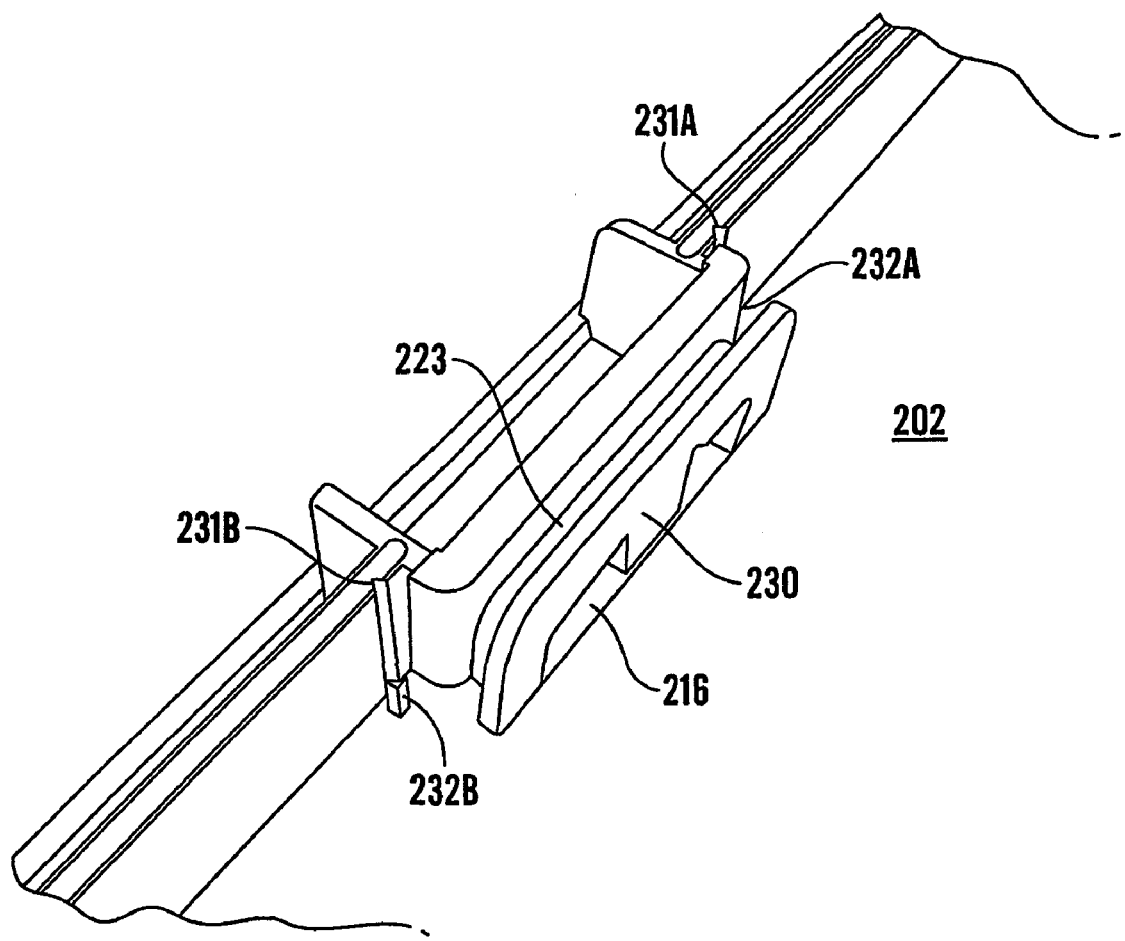
Figure 21:
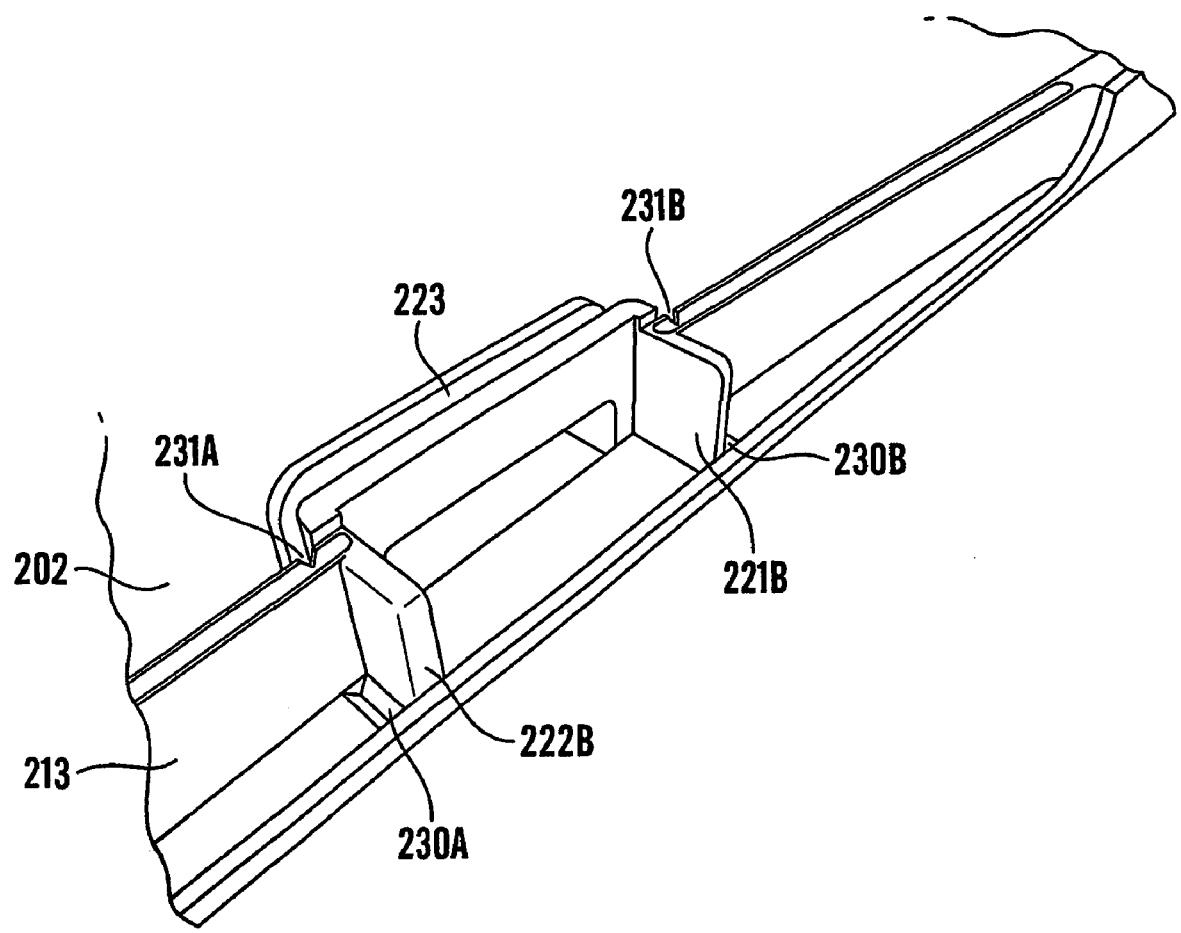
Figure 22:
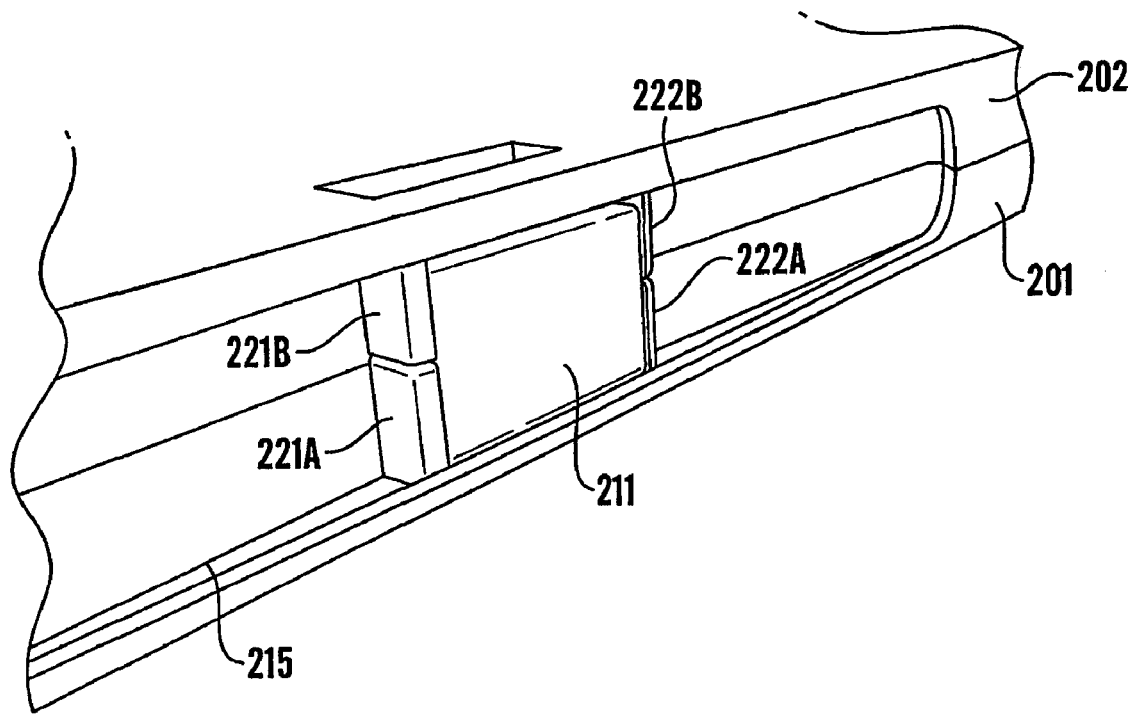
Figure 23A:
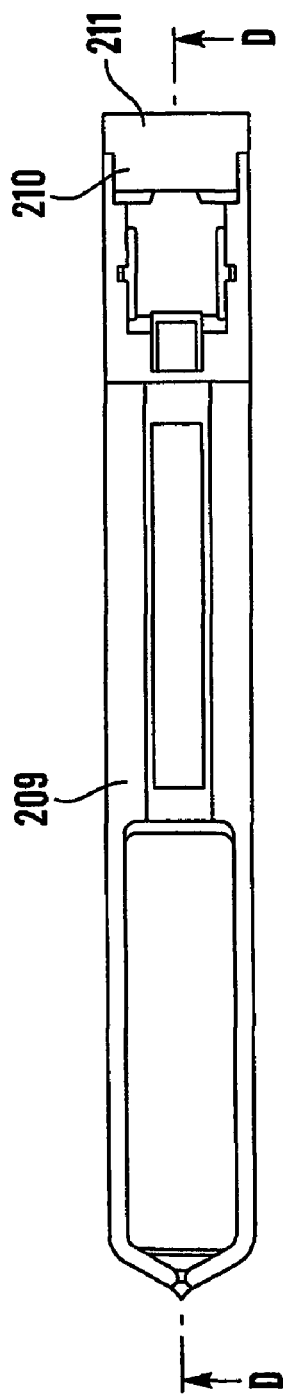
Figure 23B:
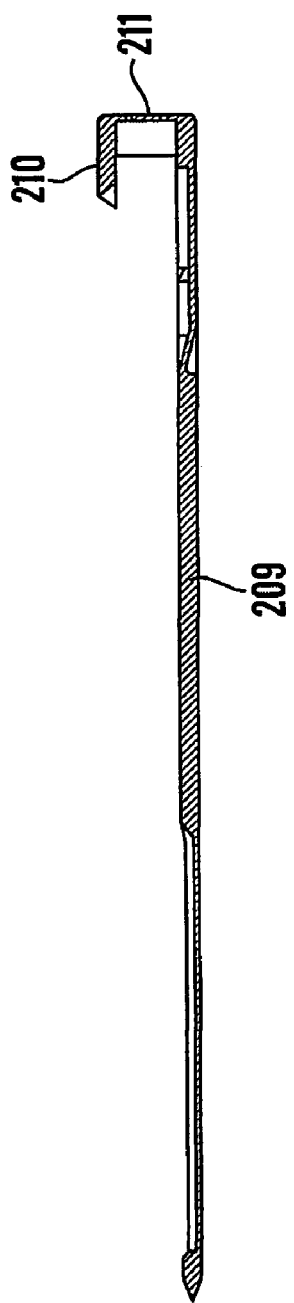
Figure 23C:
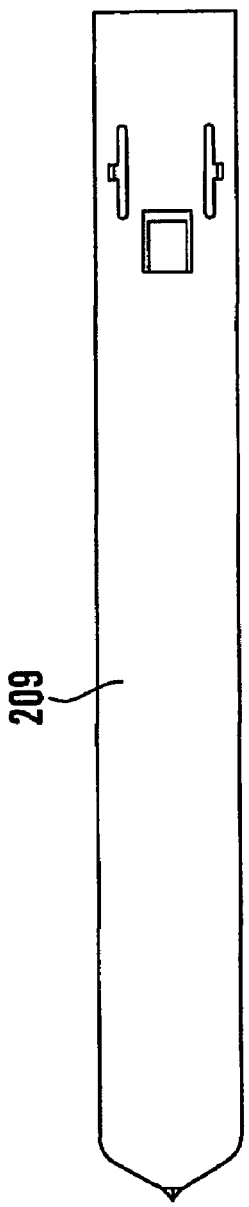

FIG. 16 shows a plan view of another embodiment of apparatus according to the invention in an open configuration with a security device partially inserted therein;

FIG. 17 is an enlarged, perspective view of a first part of the apparatus shown in FIG. 16 (seen from the direction A indicated therein);

FIG. 18 is an enlarged, perspective view of a second part of the apparatus shown in FIG. 16 (seen from the direction B indicated therein);

FIG. 19A is a cross-sectional view along line C-C of part of the apparatus shown in FIG. 16 in a closed configuration, with the security device inserted fully therein in its operational position;

FIG. 19B is a cross-sectional view similar to FIG. 19A with the security device pushed slightly further in prior to being ejected;

FIG. 20 is a perspective view of the part of the apparatus shown in FIG. 18 seen from the opposite direction;

FIG. 21 is a perspective view of the part of the apparatus shown in FIG. 18 from a similar angle, with further modification;

FIG. 22 is a perspective view of part of the apparatus in the configuration of FIG. 19A;

FIGS. 23A, 23B and 23C are a plan view, sectional view on line D-D and an underneath view of a security device such as that shown partially inserted in FIG. 16; and FIGS. 24A and 24B, FIGS. 25A and 25B and FIGS. 26A and 26B are plan and cross-sectional views of another embodiment of the invention showing a security device installed in the apparatus, partially withdrawn therefrom and being then being cut in two to remove it therefrom.

Figure 27:
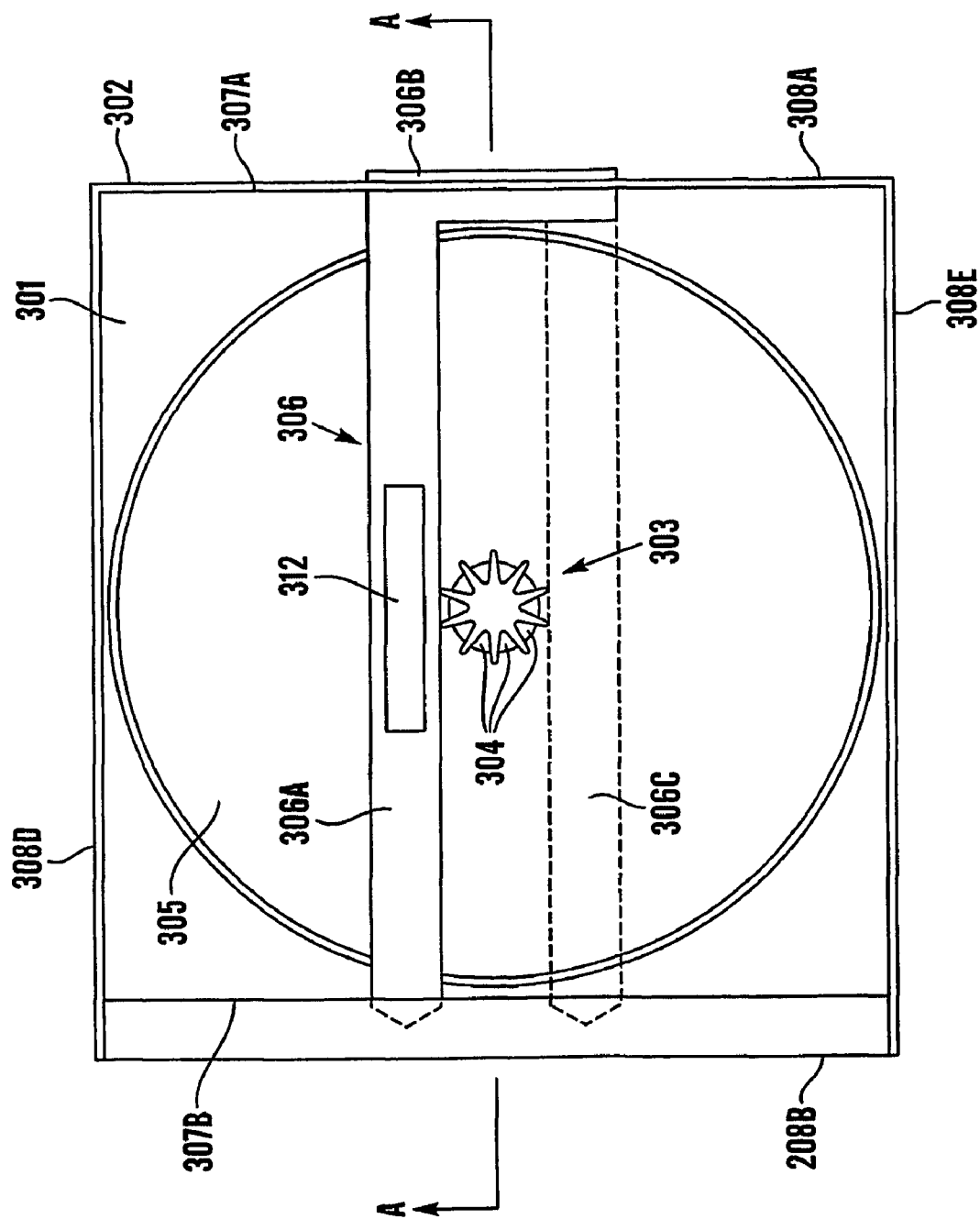

FIG. 27 is a plan view of apparatus for holding a compact disk with a security member installed therein according to another embodiment of the invention;

FIG. 28 is a side cross-sectional view taken along line A-A of FIG. 27;

FIG. 29 is a side cross-sectional view of a further embodiment of the invention.

Figure 30A:
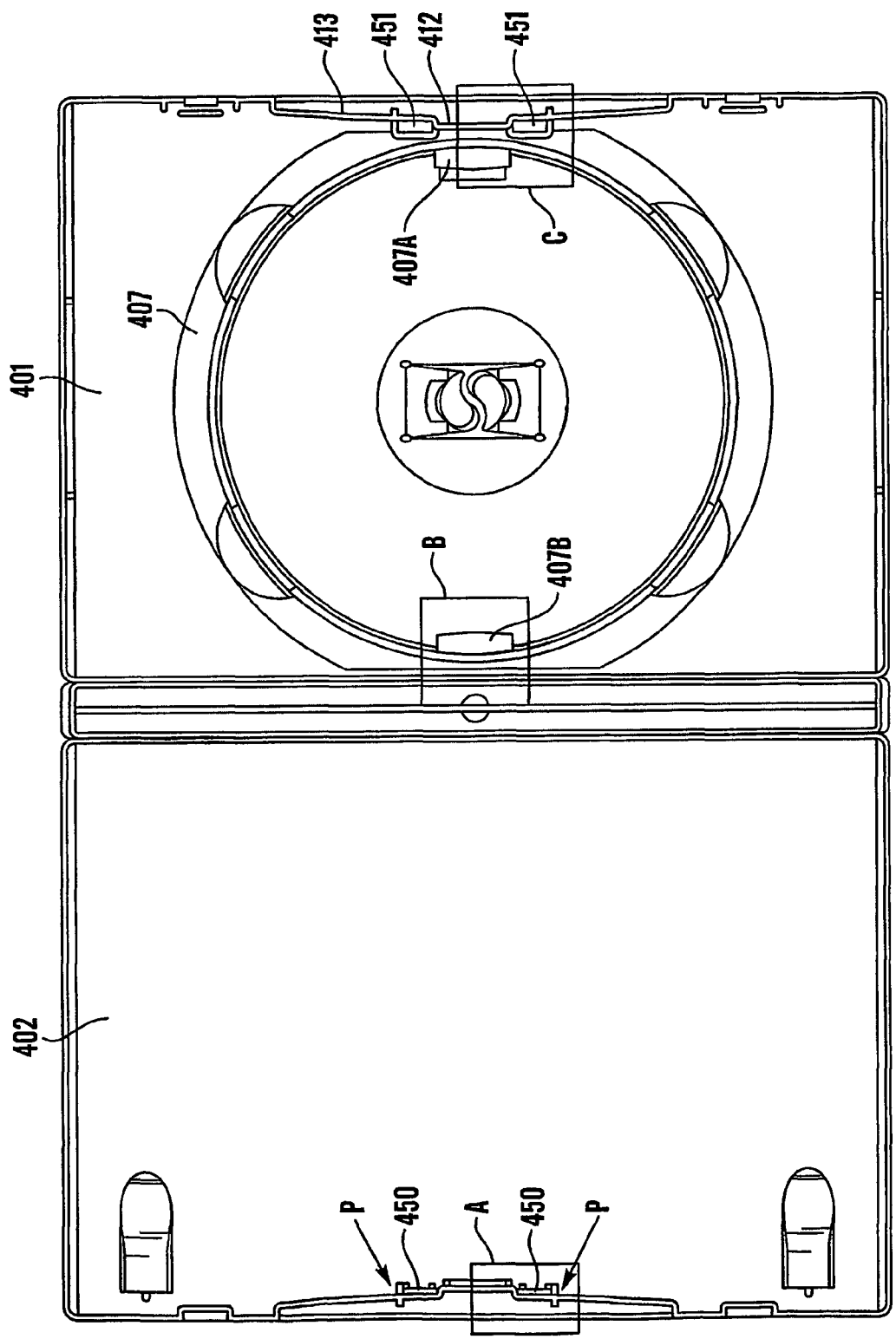
Figure 30B:
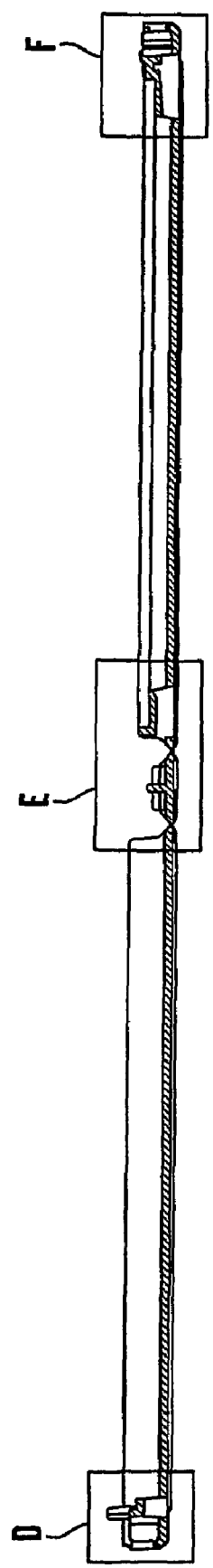
Figure 32:
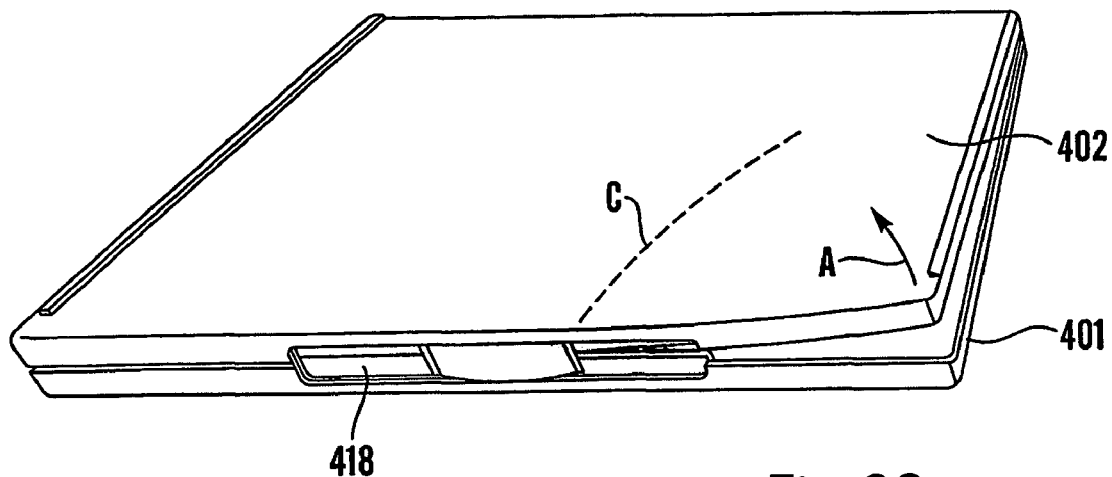
Figure 33A:
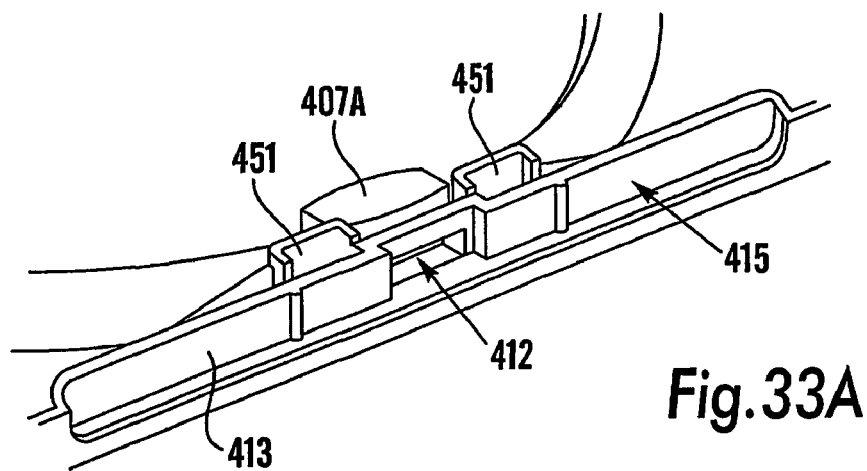
Figure 33B:
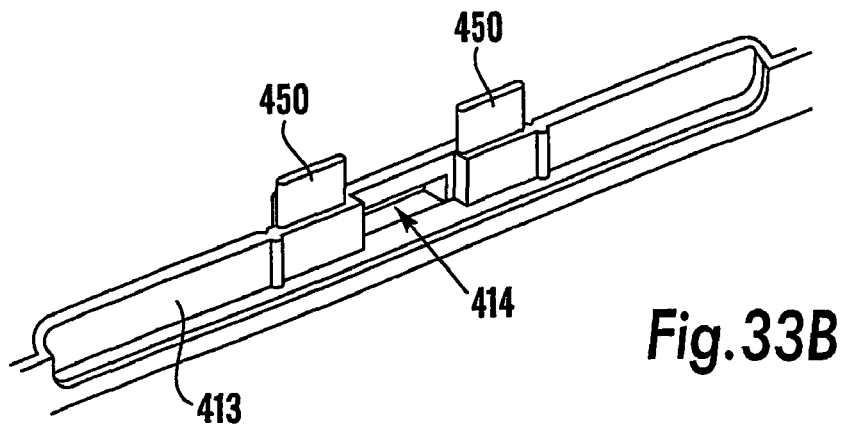

FIGS. 30A and 30B are plan and side views respectively of apparatus similar to that shown in FIG. 1 (without the security device) with various modifications made thereto;

FIGS. 31A to 31F are enlarged views of parts of FIGS. 30A, 30B labelled A to F respectively;

FIG. 32 is a perspective view of the apparatus shown in FIG. 30 in the closed position illustrating an attempt to open the apparatus by lifting one corner of the lid;

FIGS. 33A and 33B are perspective views of parts of the apparatus shown in FIGS. 30 and 32.

Figure 34:
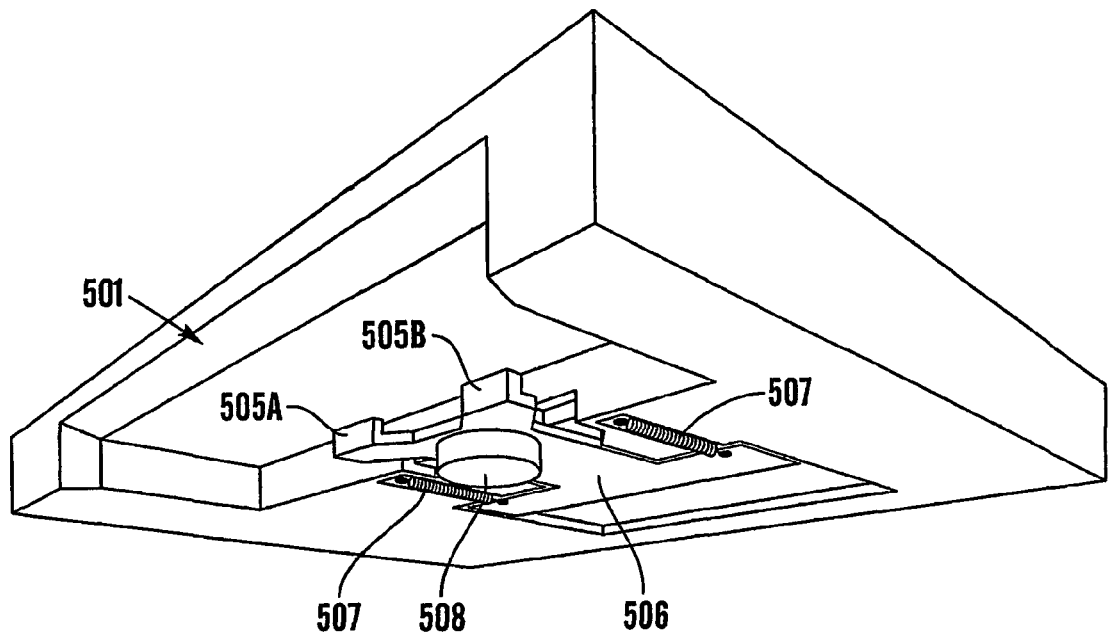
Figure 35:
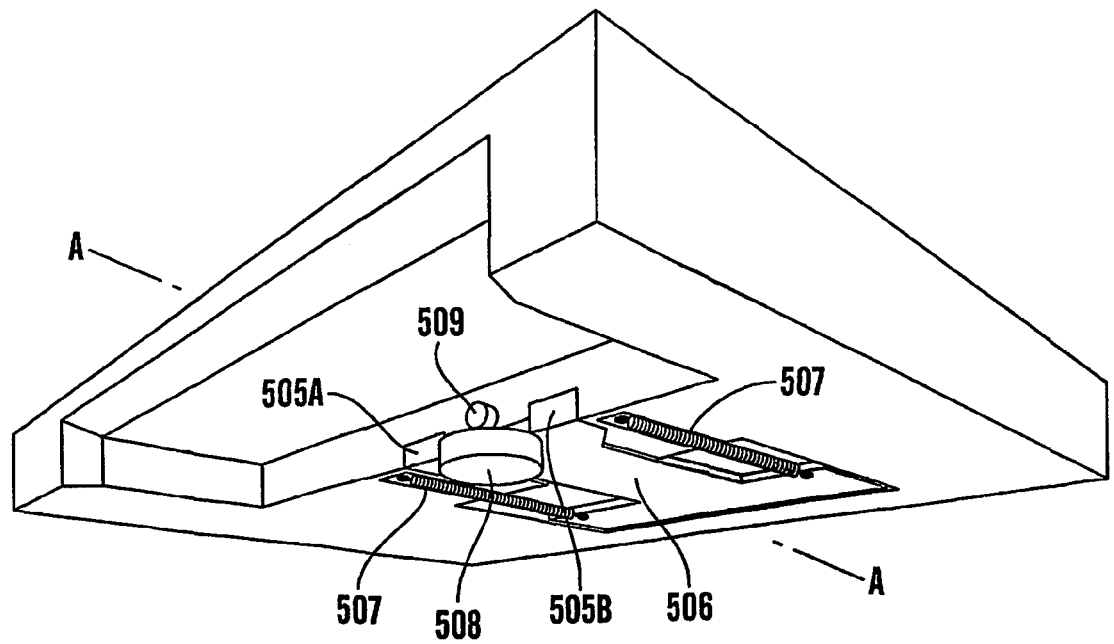
Figure 36A:
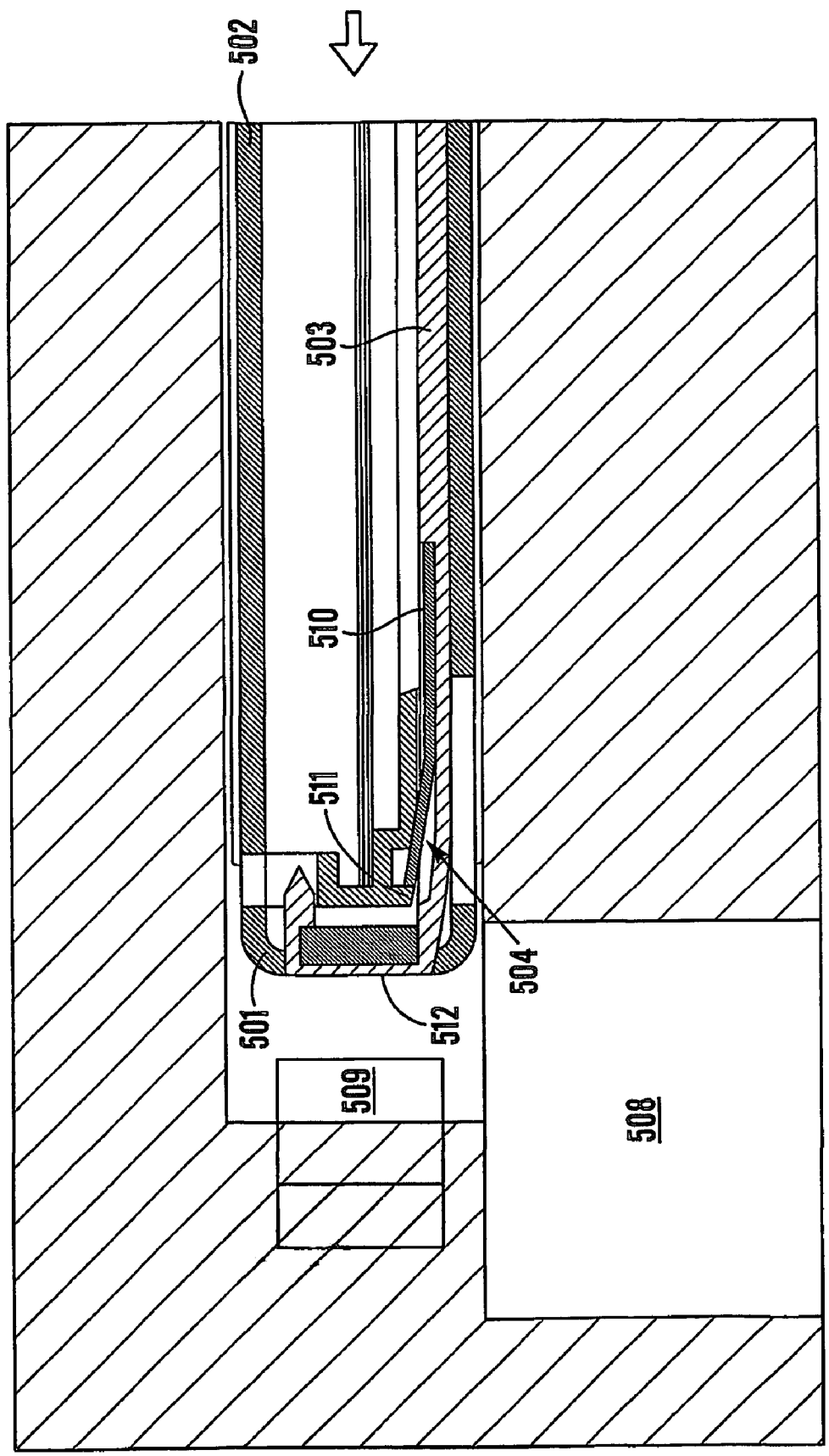
Figure 36B:
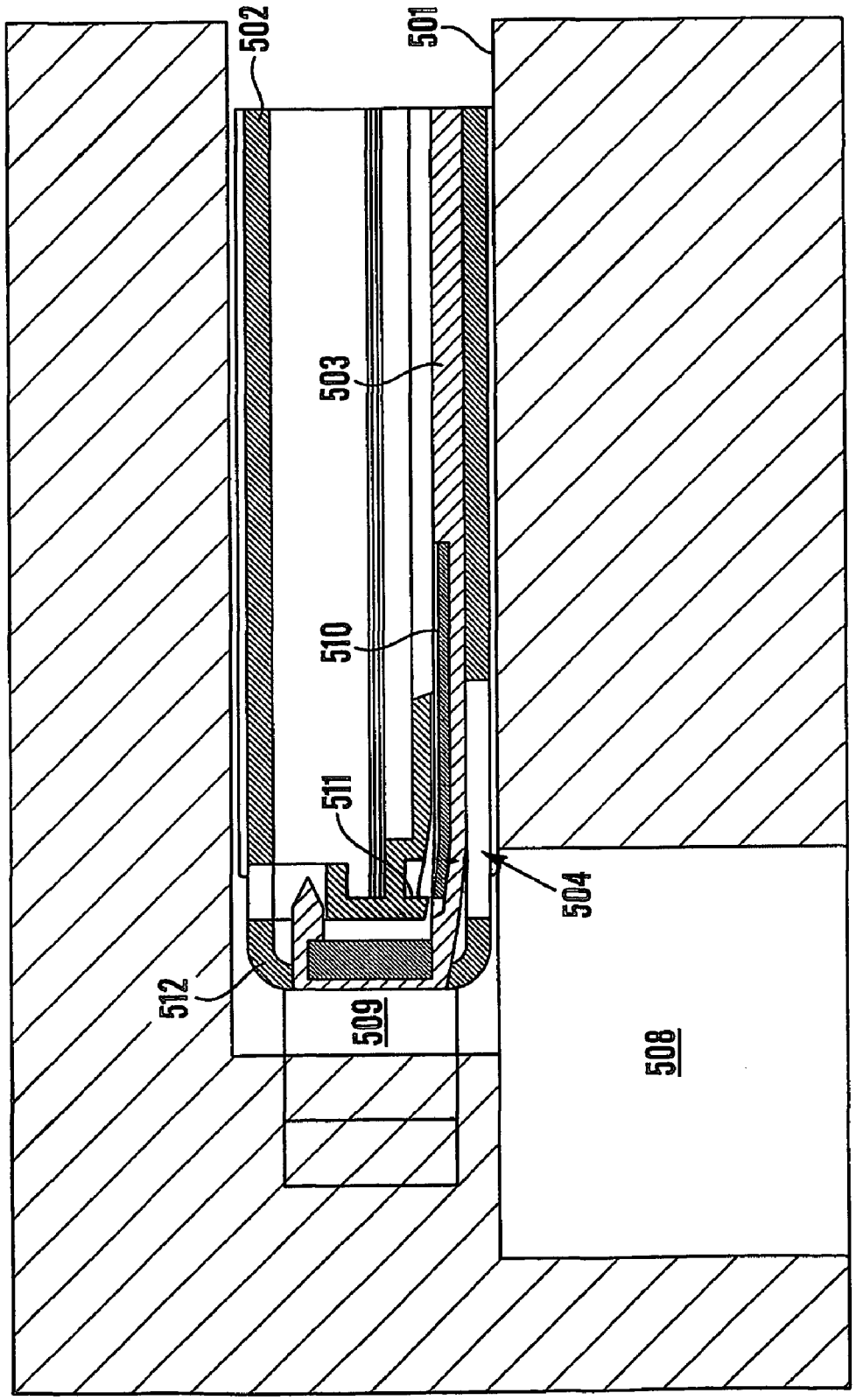
Figure 36C:
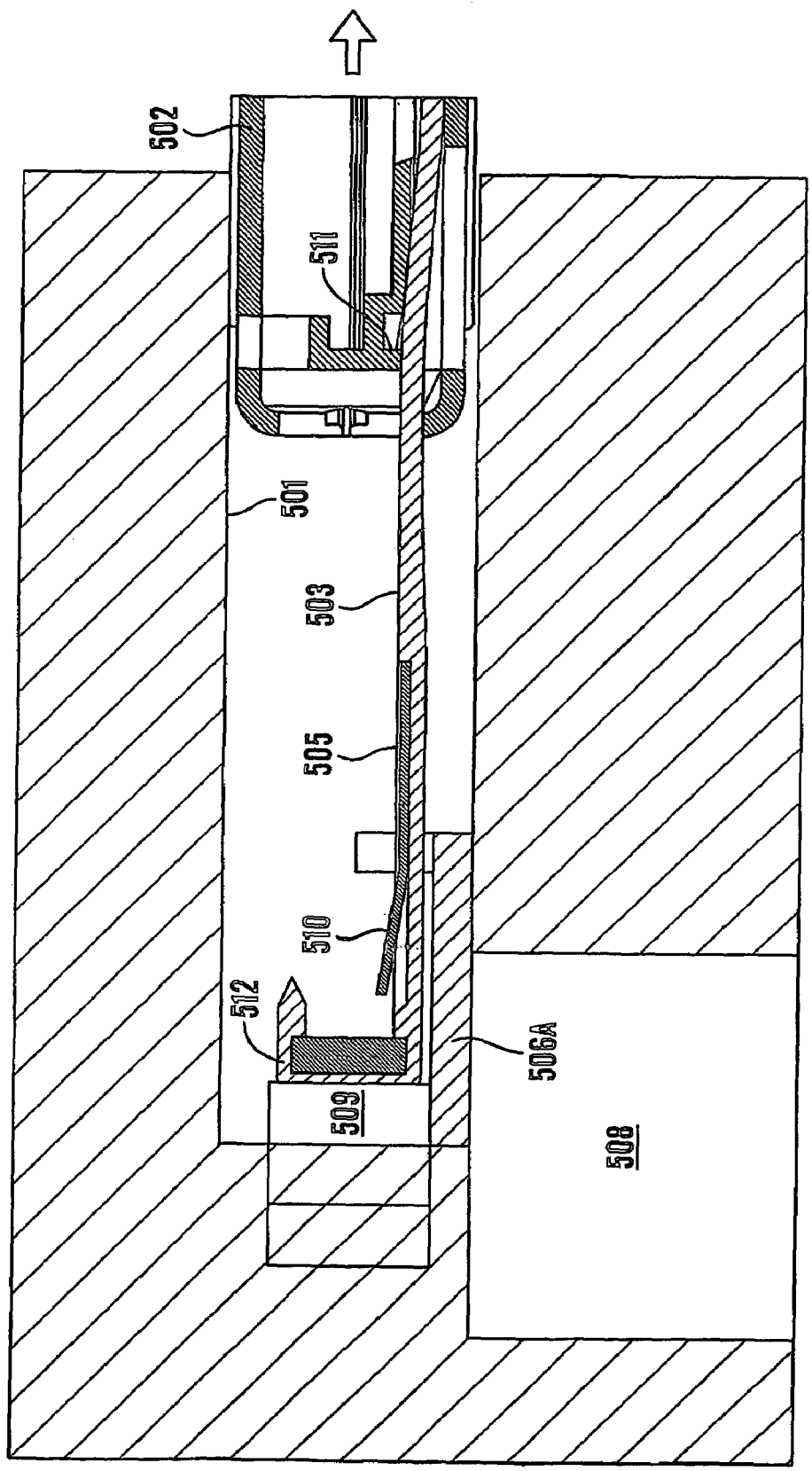
Figure 37B:
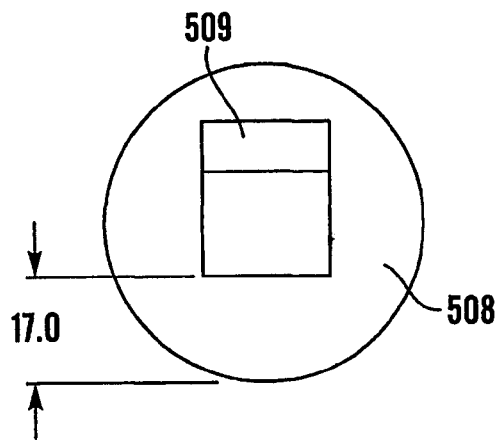
Figure 37A:
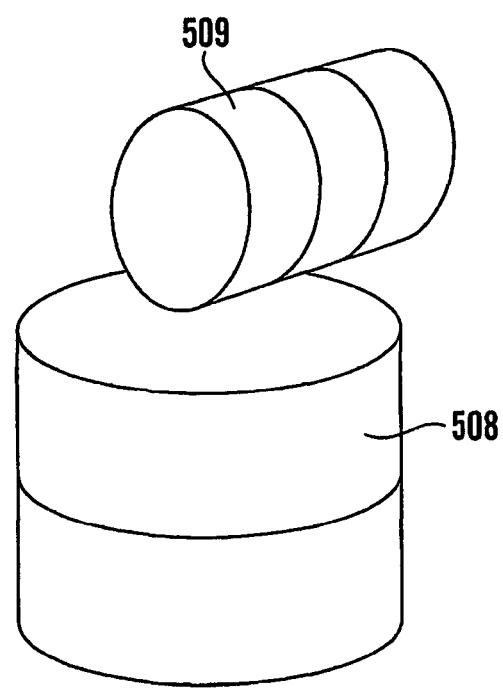
Figure 37C:
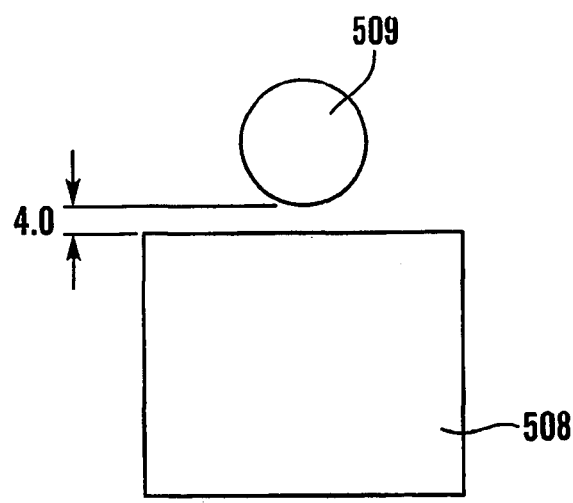
Figure 38:
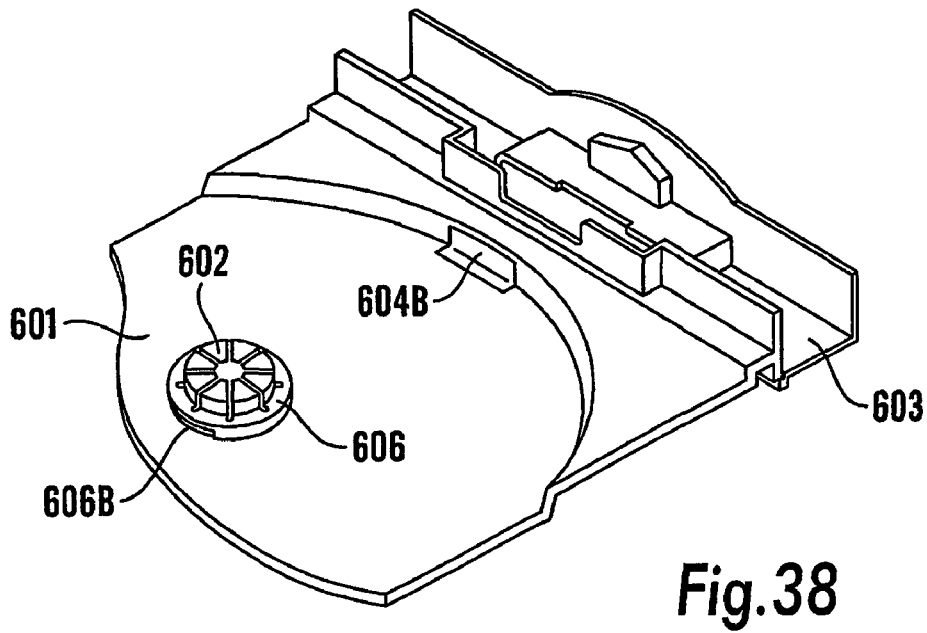
Figure 39:
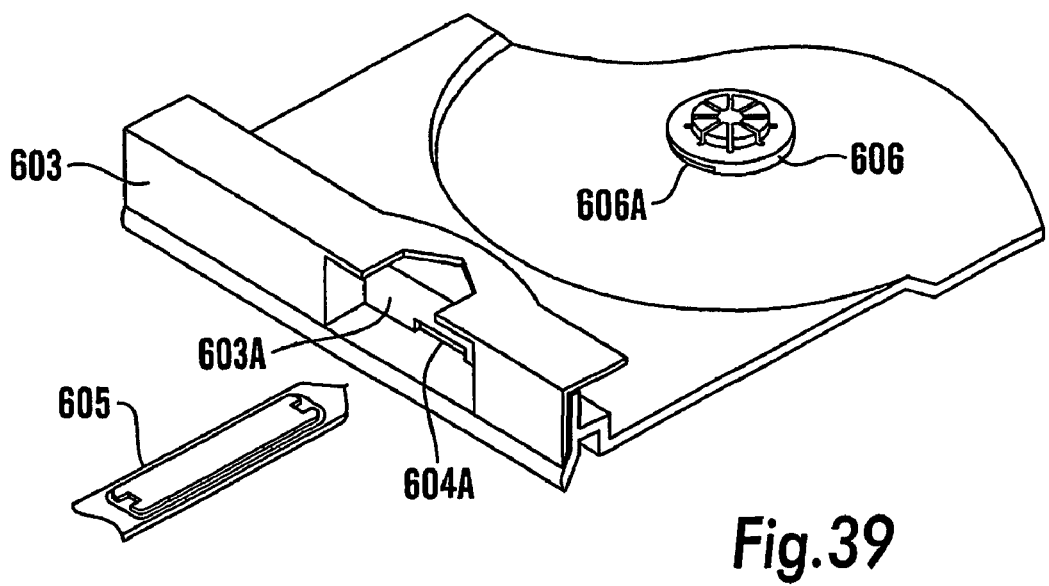
Figure 40:
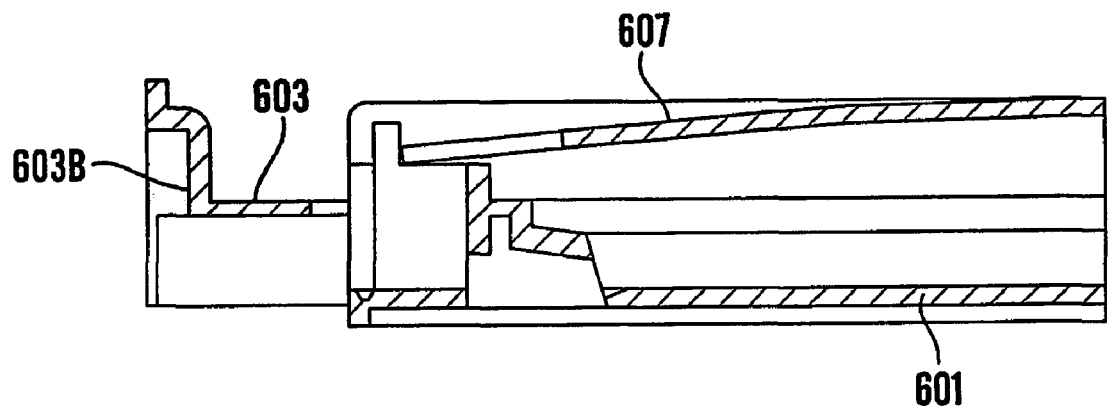
Figure 41:
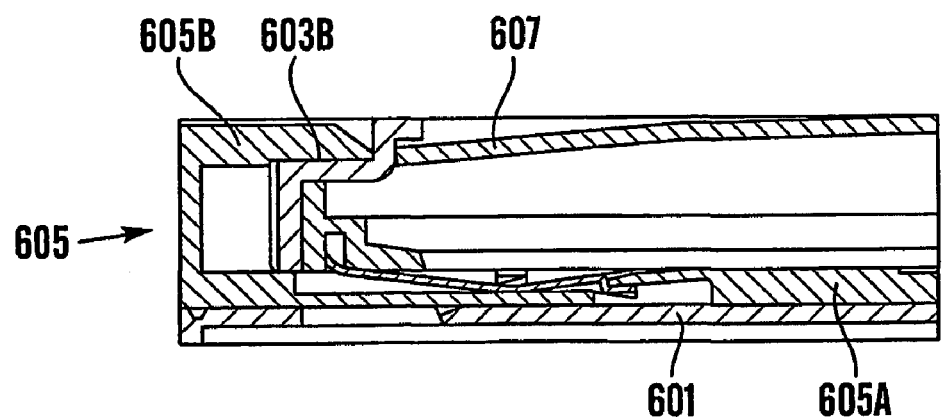

FIG. 34 is a perspective, part cut-away, view (from in front and beneath) of a preferred embodiment of apparatus for releasing a security member according to the invention prior to insertion of a container therein;

FIG. 35 is a corresponding view of the apparatus as it would be when a container is fully inserted therein (although the container is omitted for clarity);

FIGS. 36A-36C are cross-sectional views on line A-A of FIG. 35 with the container shown being inserted, in the fully inserted position and being withdrawn;

FIGS. 37A-37C show a plan view, a front view and a perspective view, respectively, of two magnets used in the apparatus shown in FIGS. 34-36;

FIGS. 38 and 39 are partial, perspective views of a further embodiment of apparatus according to the invention, FIG. 38 showing the apparatus in an open configuration and FIG. 39 showing the apparatus in a, closed configuration (a cover member not being shown in these Figures); and FIGS. 40 and 41 are cross-sectional views of the apparatus shown in FIGS. 38 and 39 in the open and closed configurations, respectively.

The apparatus for holding a disk shaped information storage media such as a DVD shown in FIG. 1 comprises a base portion 1 and a lid portion 2 (only part of which is shown) connected by a hinge portion 3. A disk engaging mechanism 4 is provided on the base portion 12 for releasably engaging the central aperture of a DVD or CD The mechanism preferably comprises at least one cantilevered arm 5 with a button-like member 6 at the radially inner end thereof. The example shown comprises two cantilevered arms each having a button portion at its inner end.

An upstand 7 is provided on the base portion so as to extend around the periphery of a disk mounted in the apparatus.

The apparatus operates in the manner described in U.S. Pat. No. 5,788,068 and WO97/41563 referred to above. This will not be described further here other than to note that to release a disk from the apparatus, the button portions 6 and the arms 5 on which they are provided must be depressed. Accordingly, by inserting a security device 8 beneath the arms 5 when the disk is in place, the disk can be locked on the button 6. This is described further in the UK patent application No. 0024890.6, U.S. patent application Ser. No. 60/287,670 and PCT patent application no. PCT/GB01/04553 the disclosures of which are also incorporated herein.

The security device 8 shown is FIG. 1 comprises a first long arm 9 and a second, shorter arm 10 the two arms being connected to a head 11. The two arms 9, 10 and the head 11 each comprises a flat strip of a relatively tough plastics material, e.g. glass re-enforced nylon™ or ABS each being approximately 8-12 mm wide and 1.0 to 1.5 mm thick.

The long arm passes 9 through a slot 12 in a side wall 13 of the base portion and through a slot 14 in the upstand 7 so that it can extend across the base portion 1 and be fitted beneath he arms 5 in order to prevent operation of the disk release mechanism 4 as described in GB0024890.6.

FIG. 1 shows the security device 8 partially inserted in the apparatus. Once the lid 2 of the case is moved to the closed position, the security device 8 is pushed further in the case so that the head 11 lies within a recess 15 in the edge of the case (this recess being provided to facilitate finger access to the opening edge of the case) and the shorter arm 10 passes through a slot in the edge of the lid portion 2 so as to hold the lid 2 in the closed position, as will be described further below.

The security device 8 can be locked in place in a variety of ways depending upon the level of security required. In a simple form, requiring only a low level of security, the security device 8 may be inserted into the case to lock the disk release mechanism 8 and to hold the case closed and the case then provided with a wrapping (not shown), e.g. a clear plastics sleeve or shrink wrapping, passing over the recess 15 so the device 8 can only be removed following breakage or removal of this wrapping.

In addition, a conventional security tag (not shown) can be mounted on the longer arm 9 (or the shorter arm 10 if it is big enough) so it cannot be removed without withdrawing the device 8 from the case. Alternatively, the security tag can be mounted on the inner face of the head 11 or positioned such that it is sandwiched between the head 11 and the side wall 13 of the case when the device 8 is fully inserted within the case so, again, it cannot be removed without withdrawing the device 8 from the case.

Figure 2:
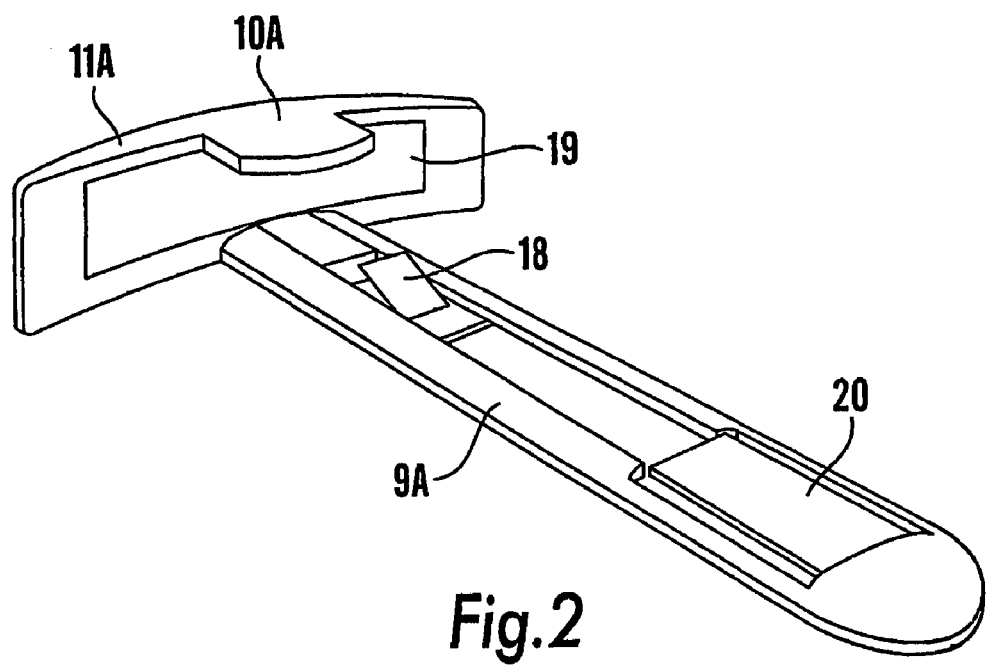
FIG. 2 is a perspective view of a second embodiment of a security device, similar to that shown in FIG. 1.
Figure 3:
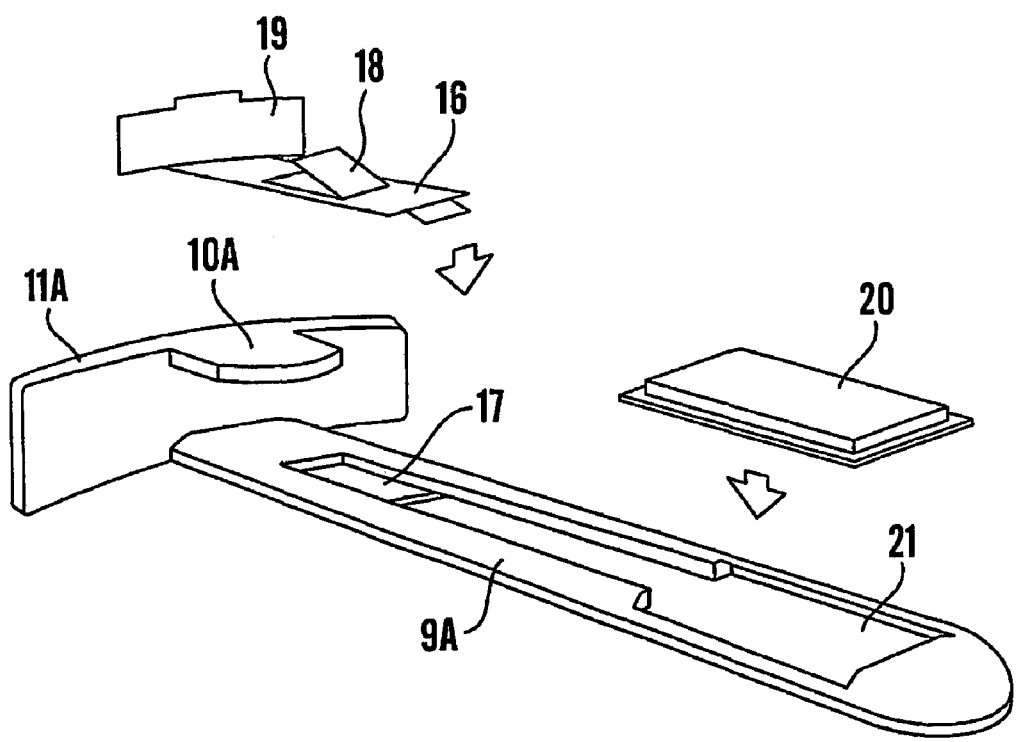
FIG. 3 is a perspective view illustrating the components of the security device shown in FIG. 2.

FIGS. 2 and 3 show another form of the security device 8A similar to that shown in FIG. 1. The device 8A again has a long arm 9A, a short arm 10A and a head 11A. In addition, it is provided with a pressed steel insert 16 which fits within a groove 17 provided in the long arm 9A and against an inner surface of the head 11A. The insert 16 comprises a resilient projection in the form of a spring arm 18, which projects upwardly from the arm 9A with its free end towards the head 11, and an end piece 19 which lies against the inner surface of the head 11 and fits between the long and short arms 9A, 10A.

A security tag 20, e.g. a Sensormatic™ Ultra-max label, is mounted within a recess 21 provided in the longer arm 9A and may be secured therein by adhesive.

The device 8A fits into the case in a similar manner to that shown in FIG. 1 so the long arm 9A fits beneath the arms 5 to lock the disk release mechanism 4. In this case, the security tag 20 is positioned on the arm 9A so that it is located beneath the disk held in the apparatus and beneath the arms 5.

Figure 4:
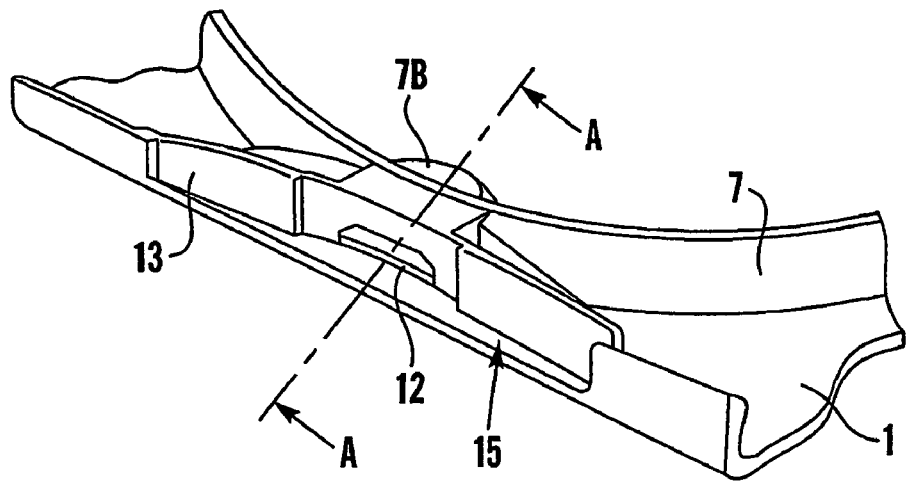
FIG. 4 is a perspective view of part of apparatus similar to that of FIG. 1 showing an aperture into which the security device of FIGS. 2 and 3 fits.

The function of the steel insert 16 will be described below in relation to FIGS. 4-6. FIG. 4 shows an enlarged view of the edge 13 of the base portion and the recess 15 therein and shows the slot 12 through which the long arm 9A of the device 8A is inserted.

Figure 5:
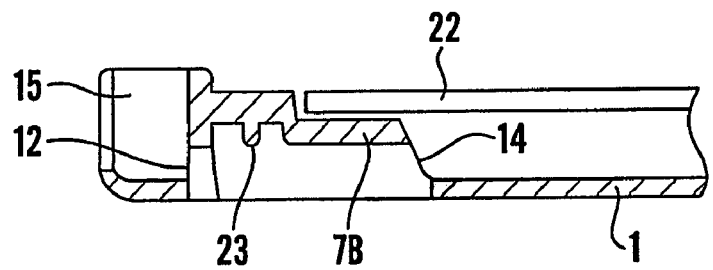
FIG. 5 is a cross sectional view taken on line A-A of FIG. 4.

FIG. 5 shows a cross sectional view taken on line A-A of FIG. 5 and shows the slot 12 and the slot 14 through the upstand 7. It also shows part of a disk 22 held on the apparatus. The underside of the upstand 7 is formed with a substantially rigid projection 23 which projects downwardly towards the base of the base portion 1, the purpose of which will be described below.

Figure 6:
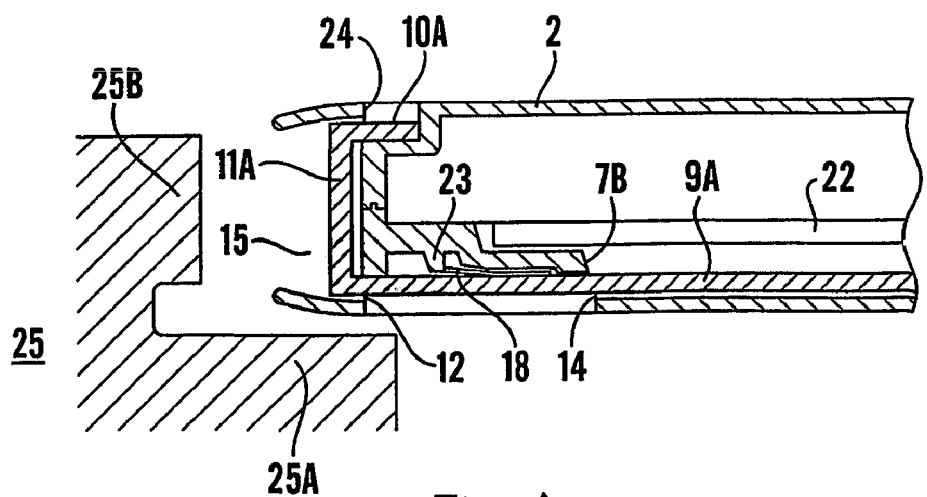
FIG. 6 is a similar cross-sectional view of the apparatus when closed with the security device in place.

FIG. 6 shows a cross-section corresponding to that of FIG. 5 when the lid portion 2 has been moved to the closed position so as to fit against the lower portion 1 and the security device 8A is inserted into the case. The longer arm 9A of the device 8A is slid through the slots 12 and 14 until the distal end of spring arm 18 passes the projection 23. The resilience of the spring arm 18 then causes the distal end of thereof to engage a side of the projection 23. The device 8A is thus locked within the case and cannot be slid back out without disengaging the spring arm 18 from the projection 23.

As shown in FIG. 6, the shorter arm 10A of the device 8A fits within a slot 24 in the lid portion 2 and thus holds the lid 2 in the closed position against the base portion 1. The case cannot thus be opened until the spring arm 18 is disengaged from the projection 23 to enable the device 8A to be slid outwards until the shorter arm 10A moves out of engagement with the lid portion 2 to allow the lid portion 2 to be moved away from the base portion 1. Furthermore, whilst the device 8A is in the position shown in FIG. 6, the long arm 9A prevents the disk from being released from the disk engaging mechanism as described above and in GB0024890.6.

The spring arm 18 is inaccessible from the exterior of the case so making it difficult, if not impossible, for a potential thief to open the case, to remove the security tag 20 or remove the disk 22 from the case.

In order to release the device 8A from the case, the case is brought up to a magnetic release device 25 which is shaped so as to align a first part 25A adjacent the case in alignment with the spring arm 18 so as to draw the arm 18 out of engagement within the projection 23 and to align a second part 25B with the head 11A of the device so the magnetic pull on the end piece 10 of the metal insert 16 withdraws the device 8A from the cas at least far enough to prevent re-engagement of the spring arm 18 with the projection 23. The device 8A can then be withdrawn from the case.

Prior to the spring arm 18 being drawn away from the projection 23, the device 8A is preferably pushed slightly further into the case, e.g. by a distance of up to 0.5 mm, to move the tip of the arm 18 out of engagement with the side of the projection 23 so the arm 18 is free to move without the tip of the arm riding over or becoming stuck on the side face of the projection 23. This small movement is conveniently allowed for by making the end piece 19 of the metal insert slightly curved so that pressure on the head 11A towards the case, flattens the end of piece 19 against the side face of the case. When this pressure is released, the end piece 19 springs back to its curved form and the movement of the arm 9A may be sufficient to move the arm 9A outwards a sufficient distance to prevent the spring arm 18 re-engaging the side face of the projection 23 when the force drawing the arm 18 away from the projection 23 is released.

The magnetic release device 25 thus applies a first magnetic force in a first direction to release the locking device formed by the spring arm 18 and projection 23 and a second magnetic force in a second direction to withdraw the security device from the case at least far enough to prevent re-engagement of the locking device when it is no longer held in a release position by the first magnetic force. The security device can then be withdrawn from the case manually or the second magnetic force may be used to pull it out of the case.

The spring arm 18 and projection 23 thus form a locking mechanism for locking the security device 8A in the case.

The spring arm can also be made of a non-magnetic material but arranged to be moved by a magnetic component mounted thereon or adjacent thereto, e.g. formed of steel or a magnet.

The magnetic release device 25 can be provided adjacent a sales till in a store for use only by sales staff. Once the security device 8A has been withdrawn, the case and the disk held therein can be taken from the store by a customer without triggering an alarm. The security device 8A can then be re-used in another case.

The provision of a metal or magnetic component the position of which can be altered by application of a magnetic force thus enables the security member to be removed.

Figure 7:
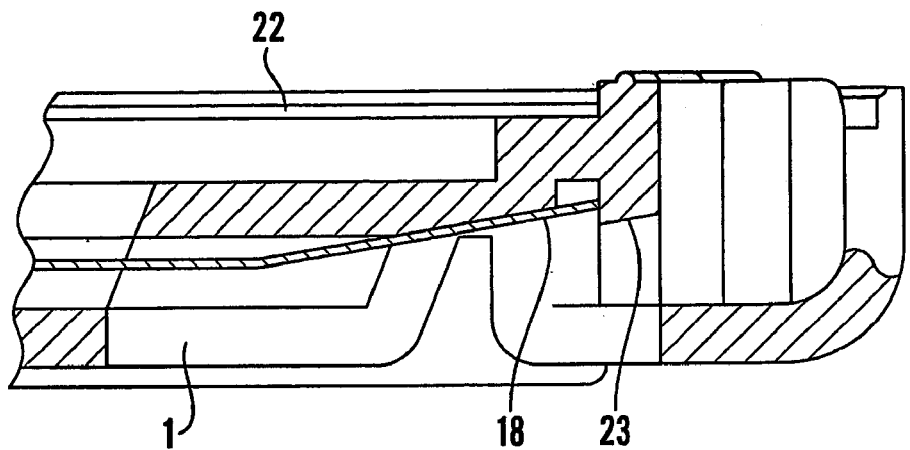
FIG. 7 is an enlarged view of part of FIG. 5 (viewed in the opposite direction)

FIG. 7 shows an enlarged view similar to that of FIG. 5 (but from the opposite direction), showing the spring arm 18 engaged with the projection 23 (which in this case is provided at the outer edge of the underside of the upstand 7 rather than in the position shown in FIG. 6).

Figure 8:
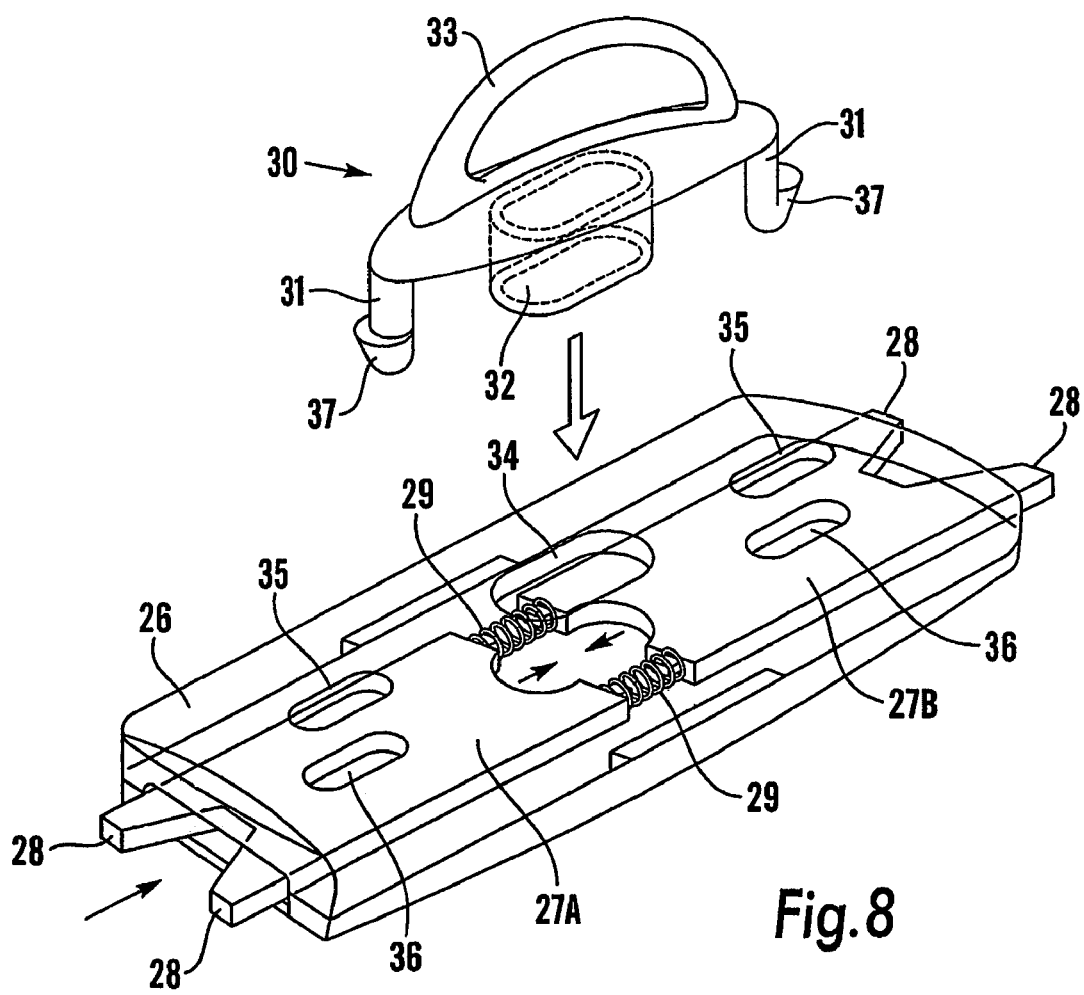
FIG. 8 shows a perspective view of a further embodiment of a releasable security member which fits within a recess in the edge of a case in a second embodiment of the invention.

FIG. 8 shows a perspective view of another embodiment of a releasable security device according to a second embodiment of the invention. This comprises a body 26 which fits within the finger recess 15 of a case and which has two longitudinally slidable metal plates 27A and 27B therein, each provided with two prongs 28 at their outer ends. The plates 27A and 27B are urged apart by springs 29 so the prongs 28 project from the ends of the body 26. The figure also shows a key 30 comprising two legs 31, a projection housing a magnet 32 and a handle 33.

When the key is inserted in an aperture 34 in the centre of the body 26, the magnet 32 is positioned between the metal plates 27A, 27B and draws them inwards against the action of the springs 29 so the prongs 28 are retracted. The body can then be inserted into the finger recess 15 of a case. When the key 30 is removed, the prongs 28 project from the body 26 and engage in apertures provided in the lid and base portions 1 and 2 at each end of the finger recess 15. The prongs 28 thus engage the base and lid portions 1, 2 to hold the case closed.

The legs 31 of the key 30 fit within apertures 25 and 36 in the body 26 and the plates 27A, 27B and are designed so that when the plates 27A, 27B are retracted by the magnet 32, detents 37 on the legs 31 mechanically engage the plates 27A, 27B so the key can be used to lift the security device out of the finger recess 15.

The body 26 of the security device preferably substantially fills the finger recess 15 and the outer surface of the body 26 is preferably substantially co-planar with the edge of the case so the edge of the case with the security device is place, has a substantially smooth outer surface.

This type of security device may be used alone to lock the case closed but may also be used in conjunction with the other security functions and components described herein.

As mentioned above, the security device may be inserted into the case and a wrapper then provided around the case. However, when a locking mechanism such as that described above (in relation to FIGS. 1-7, but not that shown in FIG. 8) is used, the security device 8A may be inserted through the wrapper. To this end, the distal ends of the long and short arms 9A and 10A are pointed so they can pierce the wrapper. When the security device is fully inserted into the case, the head 11A covers the pierced areas of the wrapper. Also, the head 11A is positioned within the recess 15 and so locally distorts the wrapper so that it is pressed into the recess 15.

Cases containing a disk and which have a wrapper can thus be delivered to the store in the usual manner. The store then inserts a security device within each case (or they can be pre-installed by the packers and replicators).

It will be appreciated that the head 11A lies adjacent and substantially parallel to the edge 13 of the case and, preferably, is positioned within the recess 15 so the security device 8A does not substantially alter the external dimensions of the product. This also reduces the accessibility of the head 11A so making it more difficult to grasp if an attempt is made to try to pull it out although, in cases in which the security device is not designed to hold the case closed, the head 11A does not prevent access to the finger recess 15 so a user can still easily open the case. Furthermore, the security device 8A does not detract from the aesthetics of the product or the handling of the product by the consumer or automated packing machines.

The spring 18 and projection 23 provide a snap-fit mechanism which is activated as the security device 8A is fitted to the apparatus. Other forms of mechanism may be used to provide a similar function, i.e. allowing insertion of the security device but inhibiting removal thereof, once it reaches a given position. Insertion of the security device 8A thus inhibits removal of the disk from the apparatus, the security device automatically being locked in place when fitted to the apparatus. Such mechanisms typically comprise first and second parts arranged such that the second part can pass the first part when the member is inserted but engagement between the first and second parts prevents the second part moving past the first part in the opposite direction.

As indicated above, the spring arm 18 and projection 23 form a locking mechanism for the security device 8A so the latter can only be removed from the apparatus following release of the locking mechanism. Other forms of locking mechanism providing a similar function may be provided. Such locking devices may be released by application of a magnetic force but arrangements may also be used which require application of a special tool or key to release the device. For higher security applications the release tool may be provided with a code which has to match a code within the locking device in order to release the device.

Many different arrangements of parts which co-operate in this way can be, envisaged. In a preferred arrangement, the case may be provided with one or more fixed detents having a surface inclined to the direction of insertion of the security member on their outer side and a surface perpendicular to said direction of insertion on their inner side and the security member has one or more detents having an inclined surface on the leading side of the detent and a surface perpendicular to the direction of insertion on the other side thereof. Thus, when the security member is inserted into the case, the inclined surfaces of the two sets of detents ride over each other causing lateral movement of detents carried by the security member so they can pass each other. Once they have passed each other, the detents on the security member move back to their original lateral position so that withdrawal of the security member is prevented by engagement of the surfaces of the respective detents perpendicular to the direction of insertion.

This engagement of the detents may be released by application of a magnetic force which moves the detents on the security member laterally (either directly or by movement of a metal or magnetic component which causes or permits this lateral movement to occur) and/or by means of a specially shaped tool or key which when, applied to the security member, moves these detents laterally.

The positions of the detents may be reversed, i.e. with the substantially rigid detents provided on the security member and the laterally moveable detents provided on the case.

Detents having a similar function can be provided in many other shapes and in many other arrangements.

Figure 9A:
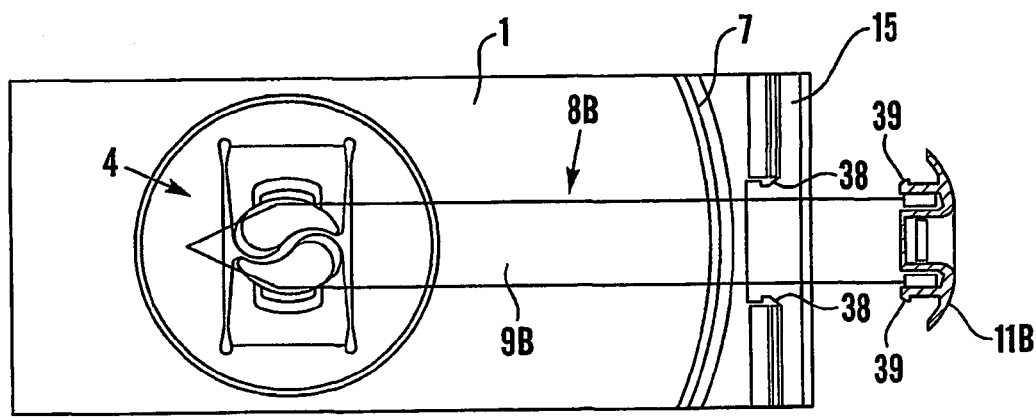
Figure 9B:
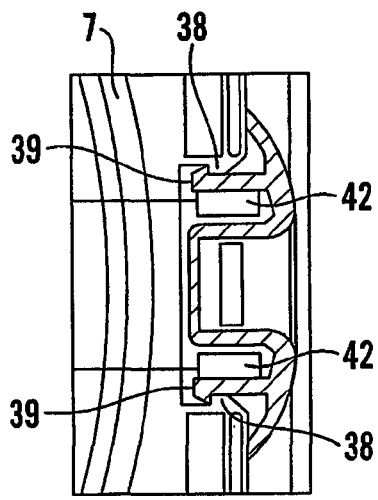
Figure 9C:
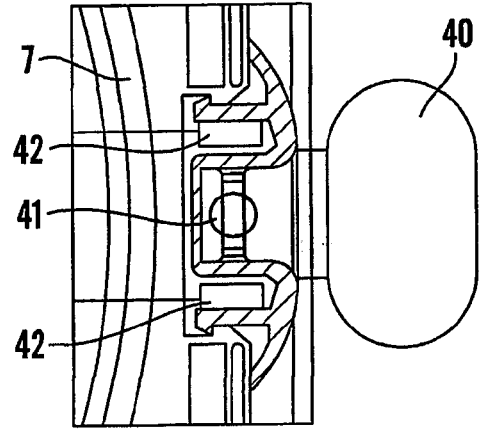
Figure 9D:
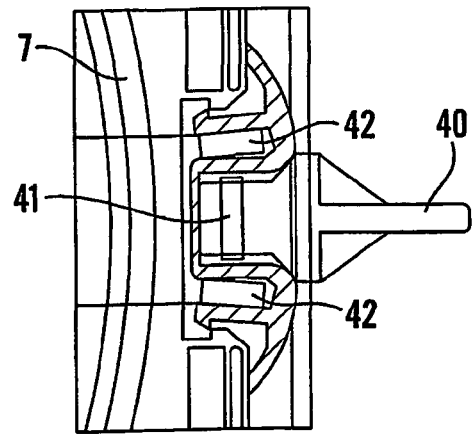

One example of such an arrangement is shown in a second embodiment of the invention which is illustrated in FIGS. 9A to 9D, which show plan views of part of a case similar to that of FIG. 1 and of a security member 8B inserted therein with the head 11B of the security member shown in cross-section. FIG. 9A shows the security member 8B only partially inserted in the case before a locking device in the head 11B engages with the case. The case is provided with fixed detents 38 and the head with laterally moveable detents 39. FIG. 9B shows an enlarged view of the head 11B engaged with the case after the detents 39 have moved past the detents 38 so the two sets of detents are engaged with each other to inhibit removal of the security member 8B from the case. FIG. 9C shows a key 40 inserted into the head 11B. The key 40 is then rotated through 90 degrees to align a magnet 41 therein with magnets 42 attached to the laterally moveable detents 39 so the detents 39 are drawn inwards to disengage from the detents 38 so the security member 8B can be withdrawn from the case. Preferably, the key 40 and head 11B are arranged so that they mechanically engage with each other in the orientation shown in FIG. 9D so the key 40 can then be used to pull the security member 8B out of the case.

The apparatus described in relation to FIGS. 2-6 provides the following security functions:

A) it inhibits operation of the disk engaging means mechanism 4,
B) it locks the disk onto the base portion
C) it holds the case closed, and
D) it prevents access to the security tag 20.

The apparatus can be modified, e.g. by omission of the shorter arm 10A and/or omission of the security tag 20 and/or by shortening of the long arm 9A, to provide only one or any combination of two of these security features as required.

In one arrangement, the security device may be designed to lock the disk on the apparatus but to allow the case to be opened so a potential container can view the contents of the case. The disk is locked to the base portion so cannot be removed from the case until the locking device is released. The security device in this arrangement may also be used to prevent access to a security tag; e.g. by mounting the tag on the underside of the security device, under the disk engaging mechanism or under the disk.

In another arrangement, the locking device may be designed to inhibit removal of the disk and inhibit removal of a security tag from the apparatus, by positioning the tag so it is inaccessible until the locking device is removed, e.g. beneath the button 6, on the underside of the arm 9A, on the inner surface of the head 11A or on the base portion 1 in a position covered by the disk when the disk is mounted on the button 6.

The use of the lockable security device to inhibit access to security tag provides significant advantages. By making the tag inaccessible until the security device is released, a potential thief is prevented from removing or tampering with the device. Furthermore, if the tag is mounted on the security device or becomes free on removal of the security device, it can be retained by the store for re-use. This helps reduce a problem due to tags being left of products or carried into another store by reducing the number of tags in circulation outside the store. Furthermore, if the tags are re-usable rather than being disposable, the stored can invest in higher specification tags providing higher levels of security and/or more sophisticated functions.

In some cases, it may be sufficient simply to provide a lockable security device to inhibit access to a security tag. The tag may be mounted on and/or concealed by the security device itself or located in a position to which access is inhibited, e.g. it may be located under the disk, until removed, or partial removal, of the security device once the device has been unlocked.

The locking device 8 described above comprises two arms 9, 10 each insertable into the apparatus. However, as mentioned, one of these arms may be omitted if the device is not designed to hold the case closed. The or each of the arms 9, 10 extend from the head 11 which comprises a substantially flat component. The head 11 is arranged to lie adjacent and substantially parallel to an external face of the apparatus when the or each arm is positioned within the apparatus. The device thus has no significant impact on the overall external dimensions of the product. The head 11 may, in some devices, lie against an external face of the case and so add to the width of the case by the thickness of the head 11 but, preferably, the head 11 is positioned within a recess so that it is co-planar with an external face of the case or recessed beneath said face.

As discussed, the security device 8 holds the case closed by means of the engagement of one arm 9 with the base portion 1 and engagement of the other arm 10 with the lid portion 2, the two arms being joined by the head portion 11. This engagement is effected by location of the arms within slots in the base and lid portions. Other forms of engagement means can, however, be used. Preferably, the engagement means are located within a recess such as the finger recess 15 provided in the edge of the box opposite the hinge portion 3, so they do not add to the dimensions of the case and so they can be concealed. Furthermore, by providing the engagement, means in such a recess, the locking device may also be designed to fit within the recess so it does not add to the external dimensions of the case.

The device described above provides a releasable security member which fits within a recess in an outer wall of the case and which can be used to inhibit access to a security tag. These functions may be provided in conjunction with the other features described above or provided on their own depending on the security functions required.

It will be appreciated that the security member 8 described above is slidable through an aperture, e.g. the slot 12, in an edge of the case opposite the hinge portion 3. The security member is thus located in the opening edge of the case opposite the hinge where it is most effective in holding the case closed. A user normally opens such a case by prising apart the base and lid portions along the edge opposite the hinge as this give maximum leverage and both portions can be easily engaged by the user's fingers or thumbs. It is for this reason, the finger recess 15 is provided in this position. The security member 8 being inserted in this edge thus holds the case closed at the point where such opening forces would normally be applied. It can also be designed to inhibit access to the edges of the base and lid portion where they are normally prised apart. Location of the security member in this edge also enables the security member 8 to be made small particularly if it is not designed to extend to the disk engaging mechanism 4, but even if it also provides this function, this is the shortest route to the disk release mechanism (for a rectangular DVD box of the type illustrated). The security member preferably slides through an aperture in the edge of the case in a direction towards the hinge portion 3.

As discussed above, a wrapping, such as conventionally used around a CD or DVD case, is preferably provided around the case. The locking member described is designed to be insertable through the wrapping and to inhibit operation of the disk engaging mechanism 4. All the advantages of being able to lock the disk to the case as described above and in GB0024890.6 can thus be achieved by simply inserting the security member into the case, even after the disk has been mounted in the case, and the case closed and sealed with a wrapper (these functions normally be performed by a packing company or disk replicator). There is therefore no need to modify the automated packing lines.

The modification to the known CD/DVD boxes to enable them to be used with the security member described above are minimal. There may also be cases where no modification may be required, but most cases will require some adaption to receive the security device therein. In the preferred embodiment described above, the moulding of the case is modified to provide th apertures 12 and/or 14 and the projection 23. However, other locking devices may be used which use existing features of the case without any need for modification apart from an aperture to allow the device to be inserted from outside the upstand 7 and/or case to reach the disk engaging mechanisms 4 or apertures in the finger recess to provide engagement with the base portion 1 and lid portion 2. Other modifications of the apparatus or box are described below.

In a further arrangement, an arm such as the arm 9 described herein, may be inserted within the case from a position outside the upstand 7. The security member can thus only be accessed and released when the case is open. Depending on the level of security required, the case may be held closed by a wrapper as described above or some other form of locking device, such as those described above (or other types) may be provided to lock the case in a closed position.

A release device is required to release a security member which is locked in place by a locking device. This may comprise apparatus such as that described in relation to FIG. 6 which may be located adjacent a till in a store and to which the locked case is offered in order to release the security member. Alternatively, the release device may be in the form of a key which is applied to the case to unlock the security member. Both types of device can take a wide variety of forms and may use mechanical engagement and/or magnetic forces to unlock the locking device. The same device preferably also assists in withdrawal of the security member from the case.

The embodiment illustrated locks the disk on the base portion by preventing activation of the disk engaging mechanism, e.g. by preventing the arms thereof from being depressed. Other ways of locking the disk relative to the base portion are envisaged.

The releasable security member may, for example, comprise one or more arms or parts which lie over the disk so as to prevent the disk from being lifted away from the base portion. Such arms may extend part way across the disk or may extend from one side of the case to the opposite side thereof. Further details of such arrangements are described below.

More than one releasable security member may also be provided, e.g. inserted through opposite edges of the case.

The releasable locking member also may not itself lock the disk on the base portion but may be used to activate a mechanism within the case which performs this function.

The apparatus for holding a disk shaped information storage media such as a DVD shown in FIG. 1 comprises a base portion 101 and a lid portion 102 connected by a hinge portion 103. A disk engaging mechanism 104 is provided on the base portion 102 for releasably engaging the central aperture of a DVD or CD. The mechanism preferably comprises at least one cantilevered arm 105 with a button-like member 106 at the radially inner end thereof. The example shown comprises two cantilevered arms each having a button portion at its inner end.

An upstand 107 is provided on the base portion 101 so as to extend around the periphery of a disk mounted in the apparatus.

This apparatus also operates in the manner described in U.S. Pat. No. 5,788,068 and WO97/41563 mentioned above. To release a disk from the apparatus, the button portions 106 and the arms 105 on which they are provided must be depressed. Accordingly, by inserting a security device 108 beneath the arms 105 when the disk is in place, the disk can be locked on the button 106.

The security device 108 shown in FIG. 10, comprises a first long arm 109 and a second, shorter arm 110, the two arms being connected to a head 111. The two arms 109, 110 each comprise a flat strip of a relatively tough plastics material, e.g. Nylon™ or ABS, each being approximately 8-12 mm wide and 1.0 to 1.5 mm thick.

The long arm passes 109 through a slot 112 in a side wall 113 of the base portion 101 and through a slot 114 in the upstand 107 so that it can extend across the base portion 101 and be fitted beneath the arms 105 in order to prevent operation of the disk release mechanism 104 as described in GB0024890.6.

FIG. 10 shows the security device 108 partially inserted in the apparatus. Once the lid 102 of the case is moved to the closed position, the security device 108 is pushed further into the case so that the head 111 lies within a recess 115 in the edge of the case (this recess being provided to facilitate finger access to the opening edge of the case) and the shorter arm 110 passes through a slot in the edge of the lid portion 102 so as to hold the lid 102 in the closed position.

The security device 108 can be locked in place in a variety of ways depending upon the level of security required. In a simple form, requiring only a low level of security, the security device 108 may be inserted into the case to lock the disk engaging mechanism 104 and to hold the case closed and the case then provided with a wrapping (not shown), e.g. a clear plastics sleeve or shrink wrapping, passing over the recess 115 so the device 108 can only be removed following breakage or removal of this wrapping. The customer can thus remove the security device once the wrapping has been removed.

A conventional security tag 117 (see FIG. 11) can, if desired, be mounted on the longer arm 109 so the tag 117 cannot be removed without withdrawing the device 108 from the case. Alternatively, the security tag 117 can be mounted on the inner face of the head 111 or positioned such that it is sandwiched between the head 111 and the side wall 113 of the case when the device 108 is fully inserted within the case so; again, it cannot be removed without withdrawing the device 108 from the case.

FIG. 11 shows a perspective view of the security device 108 together with a locking mechanism provided thereon which comprises a rigid metal pivot arm 116 mounted on the arm 109. The pivot arm comprises two portions 116A and 116B which are angled with respect to each other and joined along a pivot line 116C and is arranged to pivot about this line. Further details of these components are shown in FIGS. 12 and 13.

FIG. 12 shows a perspective view of part of the security device 108 sectioned along its centre line and a perspective view of the pivot arm 116. The pivot arm is mounted within a recess 118 within the arm 109 with lugs 116D and 116E located within cut-outs 119 (only one of which is shown) on either side of the recess 118. A tab 116F on portion 116B of the pivot arm fits beneath a resilient plastic arm 120 moulded on the arm 109 of the device.

In use, portion 116A of the pivot arm 116 acts as a latch which is biased to a raised position (so that the portion 116A projects above the upper surface of arm 109) by the action of resilient arm 120 on the tab 116F. When the security device is inserted into the apparatus, the pivot arm 116A rides over a detent provided on the apparatus and one past the detent, springs into a position in which it engages an inwardly facing side of the detent so that its engagement therewith prevents withdrawal of the security device from the apparatus. To remove the security device, the portion 116B of the pivot arm must pivot back into the recess 118 against the action of the resilient arm 120 to disengage it from the detent. This movement may be effected by direct mechanical actuation, e.g. by a specially shaped tool or key inserted into the apparatus, or by a magnetic release device which pulls the portion 116A down into the recess 118.

The above is similar to the embodiment shown in FIGS. 2 and 3 although the arrangement described above uses a resiliently biased pivot arm 116 in place of a resilient metal arm. When the metal arm is in the locked position, it resists an attempt to withdraw the security member from the apparatus. Forces applied to try to pull the security member out of the device will be resisted by the engagement of the end portions 116G against the end of the recess 118.

The arrangement illustrated in FIGS. 12 and 13 has an optional additional feature in that it is provided with a catch 121 positioned to retain the portion 116A in its retracted position within the recess 118 against the action of the resilient arm 120.

The catch 121 comprises a resilient arm shaped to engage and hold the distal end of the portion 118A of the pivot arm when it is moved to its fully retracted position as shown in FIG. 13. The catch 121 engages the end of the pivot arm as shown. Alternatively, similar catches may be provided on opposite sides of the pivot arm towards the end thereof.

The provision of the catch 121 provides the security device 108 with an additional feature, in that it can be de-activated, i.e. unlocked, but still remain within the apparatus. Without this feature, the security device 108 needs to be at least partially withdrawn from the apparatus once the engagement between the portion 118A of the pivot arm and the detent has been released otherwise the portion 118A will spring back into engagement with the detent once the force retracting it towards the recess 120 has been removed. In practice, this means that the security device has to be withdrawn from the apparatus as part of the release operation when the product is sold to a customer (or left protruding from the apparatus).

By providing the catch 121, the security device can be permanently de-activated so it is free to be removed from the apparatus but can be left in the apparatus for removal by the customer at a later stage. This greatly simplifies the unlocking procedure within the store, as it is no longer necessary to withdraw the security device within the store. In addition, it enables a security device to de-activated without the removal of any wrapping, such as a shrink wrap, which may be provided around the product in a manner which inhibits withdrawal of the security device until the wrapping is removed.

With such an arrangement, the security device may be designed for a single use, i.e. once deactivated, it is removed from the apparatus by the customer when the product is first used and then discarded.

FIGS. 14 and 15 correspond to FIGS. 12 and 13 and similar parts have the same reference numerals as in those figures. However, in this embodiment, instead of providing the catch 121, a modified form of resilient arm 120A is provided which is connected to the arm 109 at a lower position than the arm 120 of the previous embodiment. In this case, when the portion 116A of the pivot arm 116 is fully retracted into the recess 118, the tab 116F disengages from the resilient arm 120A so it is no longer resiliently biased thereby to a raised position.

Thus, in the embodiment shown in FIGS. 12 and 13 the catch 121 retains the pivot arm 116 in the retracted position against the action of biasing means whereas in the embodiment shown in FIGS. 14 and 15 the pivot arm 116 is released from the action of the biasing means when moved to its fully retracted position. In another arrangement (not shown), the pivot arm 116 may be biased towards the retracted position and releasably held in the raised or locked position.

Whilst the embodiments described above have a long arm 9 which is used to prevent operation of the disk engaging mechanism 4, a similar arrangement may be used with a security device which is used only to hold the apparatus in a closed configuration. In this case, the arm need not extend as far as the disk engaging mechanism 4. Alternatively, the arm may extend over the CD 5 to inhibit its removal from the disk engaging mechanism. Such an arm may also engage with the lid to inhibit its movement to the open position or other removal of the lid. Such arrangements may be used with other forms of apparatus besides that shown in FIG. 10, e.g. with a CD case based on the well-known jewel box.

The embodiments described above provide a locking mechanism which is switchable between two states, a first state in which it is locked so the security device cannot be removed from the apparatus and a second state in which it is unlocked or de-activated so the security device can be removed from the apparatus. In the locked state, it is necessary to apply a force to the locking mechanism to enable it to switch to the unlocked state and in the unlocked state the locking mechanism is stable, i.e. it tends to remain in the unlocked position, even if the security member remains in place.

In further embodiments, the positions of the catch 121 or the resilient arm 120A may be arranged so that the locking mechanism is movable between three positions, a locked state and a stable unlocked state as described above and an intermediate unlocked state in which the security device is free to be withdrawn from the apparatus but can still be re-locked if desired. This intermediate state may correspond, for instance, to a partially retracted position of the portion 16A of the pivot arm in which it is disengaged from the detent but has not yet engaged with the catch 121.

The apparatus described above is thus provided with a security device which is adapted to be used once and then disposed of by arranging for the locking mechanism to be permanently deactivated once moved to the unlocked position.

The apparatus shown in FIGS. 16-26 has several modifications and/or improvements over the embodiments described above.

The apparatus for holding a disk shaped information storage media such as a DVD shown in FIG. 16 is similar to that shown in FIGS. 1 and 10 comprises a base portion 201 and a lid portion 202 connected by a hinge portion 203. A disk engaging mechanism 204 is provided on the base portion 202 for releasably engaging the central aperture of a DVD or CD. The mechanism preferably comprises at least one cantilevered arm 205 with a button-like member 206 at the radially inner end thereof. The example shown comprises two cantilevered arms each having a button portion at its inner end.

An upstand 207 is provided on the base portion 1 so as to extend around the periphery of a disk mounted in the apparatus.

The apparatus again operates in the manner described in U.S. Pat. No. 5,788,068 and WO97/41563. To release a disk from the apparatus, the button portions 206 and the arms 205 on which they are provided must be depressed. Accordingly, by inserting a security device 208 beneath the arms 205 when the disk is in place, the disk can be locked on the button 206. This is described further in the UK patent application No. 0024890.6.

The security device 208 shown in FIG. 16, comprises a first long arm 209 and a second, shorter arm 210, the two arms being connected to a head 211. The two arms 209, 210 each comprise a flat strip of a relatively tough plastics material, e.g. Nylon™ or ABS, each being approximately 8-15 mm wide and 1.0 to 1.5 mm thick.

The long arm 209 is slid in a first direction (i.e. in the direction from right to left in FIG. 16) through a slot 212 in a side wall 213 of the base portion 201 and through a slot 214 in the upstand 207 so that it can extend across the base portion 201 and be fitted beneath the arms 205 in order to prevent operation of the disk release mechanism 204 as described in GB0024890.6.

FIG. 16 shows the security device 208 partially inserted in the apparatus. Once the lid 202 of the case is moved to the closed position, the security device 208 is pushed further into the case so that the head 211 lies within a finger recess 215 in the edge of the case (this recess being provided to facilitate finger access to the opening edge of the case) and the shorter arm 210 passes through a slot 216 in the edge of the lid portion 202 so as to hold the lid 202 in the closed position.

The security device 208 can be locked in place in a variety of ways depending upon the level of security required.

FIG. 17 shows an enlarged view of features adjacent the slot 212. In particular, it shows a rib or ridge 220 extending parallel to an edge of the base portion 201 to an extent similar to or slightly greater than the opening of the slot 212. The ridge 220 projects in a direction substantially perpendicular to the major plane of the base portion 201 and is provided immediately inboard of the finger recess 215.

FIG. 17 also shows barrier walls 221A and 222A in the finger recess 215 either side of the entrance to the slot 212.

FIG. 18 shows an enlarged view of features adjacent the slot 216 in the lid portion 202. In particular it shows a groove 223 which is adapted to receive ridge 220 when the lid is in the closed configuration. The groove extends parallel to an edge of the lid portion to an extent similar to or slightly greater than the opening of the slot 216 and is provided immediately inboard of the finger recess 215.

FIG. 18 also shows barrier walls 221B and 222B in the finger recess 215 either side of the entrance to the slot 216.

The cross-sectional views shown in FIGS. 19A and 19B show how the ridge 220 and groove 223 inter-engage when the apparatus is in the closed position. The purpose of this is to resist forces attempting to move the lid 202 relative to the base 201 in said first direction, i.e. the direction in which the arm 209 is slid through the slot 212 (the direction from left to right, or vice versa, in FIGS. 19A and 19B). Such forces may be applied to the apparatus by someone trying to force open the case by overcoming a locking mechanism holding the security device 208 in the case.

FIGS. 19A and 19B also show how the respective barrier walls 221A and 221B and walls 222A and 222B abut with each other. The barrier walls 221 and 222 thus inhibit access to edges of the end portion 211 of the security device 208 as shown in FIG. 22. The end portion 211 sits in a close fitting socket formed by the walls 221 and 222 and the side walls of the finger recess 215 so making it very difficult for a user to obtain a purchase on the end portion 211 either with the fingers or with a tool such as a flat-bladed screwdriver (e.g. by a thief attempting to prise the security device 208 out of the case).

The ridge 220 and groove 223 may be extended at right angles at each end thereof to provide a ridge and groove interconnection between the respective pairs of barrier walls 221A and B and 222A and B.

FIG. 19A shows the security device 208 pushed into the case to a point where the shorter arm 210 engages a resilient arm 230 which projects from the lid portion 202 across slot 216 and across the path of the, arm 210. The function of this will be described further below. FIG. 19A shows the security device 208 fully inserted into the case and in its operational position. The security device is retained in the position shown in FIG. 19A by engagement of a metal pivot arm 216 with a detent 217 provided on the base portion 201 which prevents withdrawal of the security device from the case until the pivot arm 216 is moved, e.g. by a magnetic release device or a specially shaped key, out of engagement with the detent.

Prior to releasing the security device, it is pushed slightly further into the case from the position shown in FIG. 19A to that shown in FIG. 19B, so the distal end of the shorter arm 210, which is bifurcated, pushes back the resilient arm 230. Thus, when the pivot arm 216 is released from engagement with the detent 217 on the base portion, the resilient arm 230 acts to at least partially eject the security device 208 from the case, e.g. to a position in which the end portion 211 thereof can be grasped to pull the security device further out of the case.

Part of the case is thus used to provide resilient means for ejecting, or partially ejecting, the security device once released. This means that the security device can be readily re-used in another case. A resilient arm, such as arm 230, which may be elastically deformed repeatedly may undergo creep whereby it becomes permanently deformed so its elastic resilience is reduced. Thus, if such resilient ejection means were provided on the security device 208, its performance would be likely to deteriorate over time so severely limiting the number of times the security device could be re-used. By providing the resilient ejection means on the case (which is only likely to have a security device installed in it once, i.e. prior to purchase by the end user), this difficulty is avoided.

In other cases, the resilient arm 230 may be at least partially deformed when the security device is in its operational position and thus may remain deformed over prolonged periods of time so increasing further the likelihood that its resilience will reduce over time.

FIG. 20 shows another view of the groove 223 shown in FIG. 18. It also shows the resilient arm 230 projecting from a side member of the groove across the slot 216.

FIG. 21 shows another view of the groove 223 shown from a similar angle to FIG. 18. It also shows notches or V-grooves formed within the lid portion on either side of the barrier walls 221B and 222B to act as weak points or stress-concentrators. If an attempt is made to prise open the lid portion without removing the security device 208, these help initiate a crack or fracture across the lid portion. Such catastrophic damage to the lid portion is a deterrent to a thief who does not wish to draw attention to his activities.

V-grooves 230A and 230B are provided in the walls of the finger recess 215 immediately adjacent the outer surfaces of the barrier walls 222B and 221B. V-grooves 231A and 231B are also provided in the internal surface of the exterior wall 213 of the lid portion for the same reason adjacent the ends of the groove 223. The V-grooves 231A and 231B are also shown in FIG. 29. Further V-grooves 232A and 232B may be provided at the base of V-grooves 231A and 231B angled away from the components forming the groove 223. These help encourage a crack to propagate away from the area of the security member 208.

FIGS. 23A, 23B and 23C show a plan view, side view and underneath view of the security tag 208. These show that the end portion 211 is of the same width as the long arm 209.

Figure 24A:
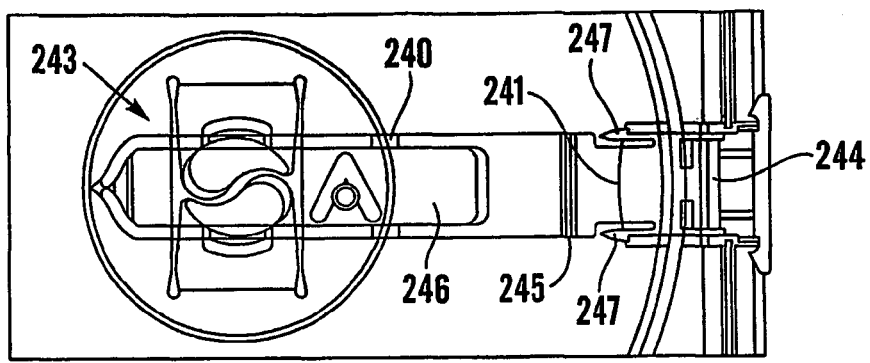
Figure 24B:
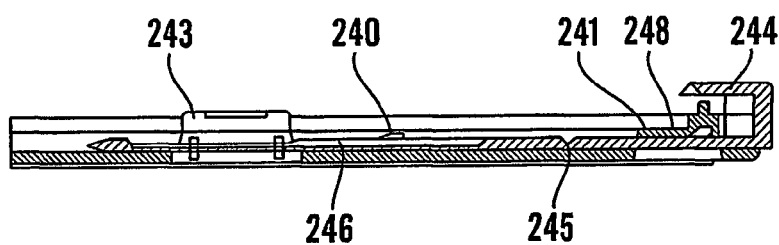
Figure 25A:
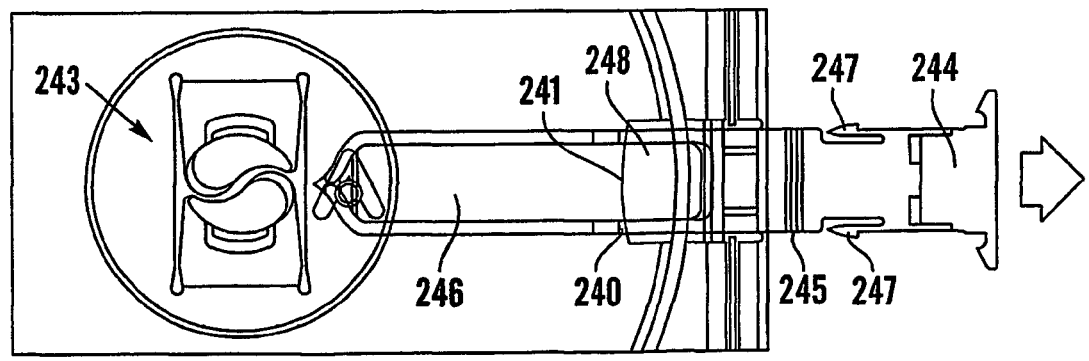
Figure 25B:
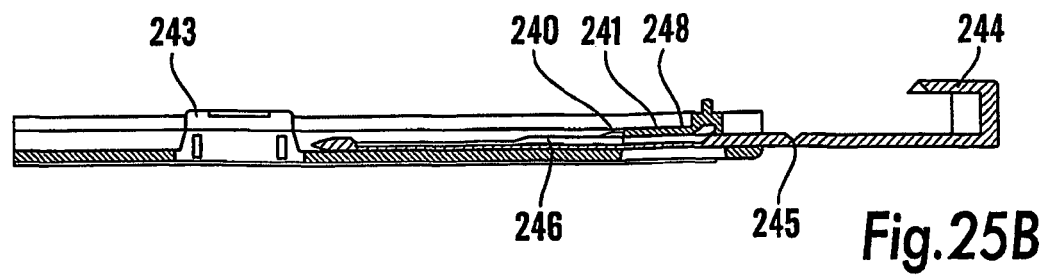

FIGS. 24, 25 and 26 show a further embodiment of apparatus with a security device for inhibiting access to and/or inhibiting removal of information s media therefrom. This embodiment comprises a locking mechanism that prevents removal of the security device from the apparatus but permits partial withdrawal of the device from the apparatus. This is achieved by providing a projection 240 partway along the security device which only engages a part 241 of apparatus to prevent removal of the device once the device has been partially withdrawn as shown in FIGS. 15A and 25B.

In the first position shown in FIGS. 24A and 24B, the device prevents operation of disk engaging means 243 so inhibits removal of a disk (not shown) from the apparatus. In the second position shown in FIGS. 25A and 25B, the device is withdrawn from the disk engaging means so permits removal of the disk.

If the device is provided with a lid (not shown), like that of FIG. 16, a short arm 244 of the device may be used to hold the lid closed in the first position and to permit it to be opened in the second position.

Figure 26A:
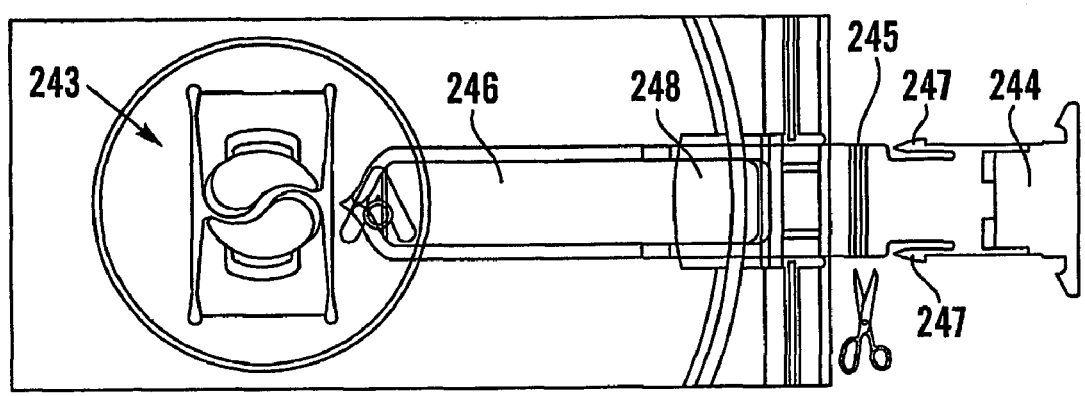
Figure 26B:
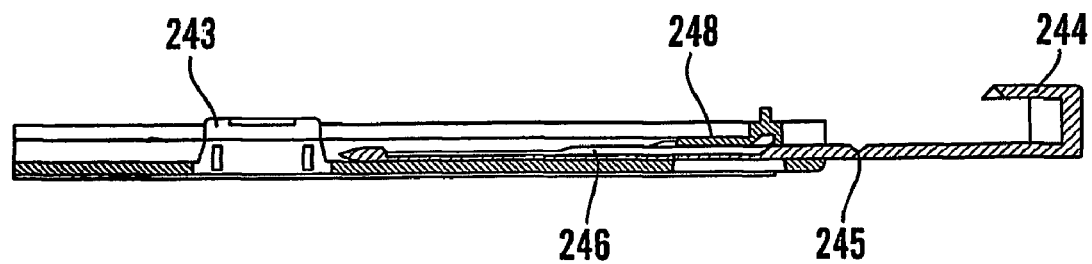

Preferably the security device is provided with a weakened portion 245 part way along its length. This may, for instance, comprise a thin area or groove across the device which can be cut through with scissors (as illustrated in FIG. 26A) or about which the device can be snapped off. In the first position, the weakened portion lies within the apparatus, so is inaccessible, whereas in the second position it is external to the device so is accessible. The device can then be cut or broken in two so the two parts thereof can be removed from the device. Preferably, the security device is formed of a material such as polypropylene and arranged so the weakened portion is difficult to cut with an ordinary pair of small scissors but can be cut with larger scissors, e.g. like a pair of kitchen scissors.

The security device is preferably provided with a holding mechanism which releasably holds the device in the first position but can be easily overcome by manually pulling in the device to move the device to the second position. The mechanism may, for example, comprise resilient arms 247 on opposite sides of the device which engage with the part 241 in the first position but are shaped to provide only a friction fit therewith which can be overcome by pulling on the device out as shown in FIGS. 25A and 25B.

A security tag may be carried by the security device, e.g. in the area 246, so it lies under the disk engaging means in the first position and under a shield 248 in the second position. It thus remains attached to the apparatus until the device is broken or cut in two and removed from the apparatus. Alternatively, the tag may be mounted on the apparatus in a position in which it is only accessible after the security device has been divided and removed from the apparatus.

The above embodiment provides a deterrent to theft without requiring the sales outlet to have infrastructure to remove the security device and/or tag. Instead the customer removes the device after they have purchased the apparatus.

The apparatus is usually provided with an overwrapping, e.g. a shrink film, which has to be broken or removed before the device can be withdrawn from the first to the second position. The apparatus can then be opened and the disk can be removed but the security tag remains attached to the apparatus. The device is then cut and the two parts removed from the apparatus. It is only then that the security tag can be separated from the apparatus.

FIGS. 27-29 show apparatus for holding a compact disc (CD) based on a well-known version thereof known as a "jewel box". The box comprises a plastic tray 301 inserted within a base member 302 having a lid member (not shown) pivotably mounted thereto. The tray 301 forms a base portion and has a central boss 303 thereon made up of a plurality of inwardly directed fingers 304 which curve upward away from the base portion and then inwardly again. The boss 303 is formed to be a push fit through the central aperture of a CD 305 so as to hold the CD 305 on the tray 301. To remove the CD from the tray 301, it is necessary to lift the CD 305 off the boss 303 and away from the tray 301, this being done by grasping the periphery of the CD whilst simultaneously depressing the inner ends of the fingers 304 to loosen the engagement between the boss 303 and the aperture of the CD 5.

FIGS. 27-29 also show a security member 306 comprising an elongate arm 306A projecting from a head portion 306B. As shown in FIG. 29, the tray has an upstand at or adjacent opposite edges thereof. A first portion 307A of the upstand is located adjacent an opening side 308A of the box and is provided with a first slot 309A. A second portion 307B of the upstand is located adjacent the hinged side 308B of the box and is provided with a second slot 309B. The arm 306A of the security member passes through the first slot 307A, across the tray 301 and has its distal end located in the second slot 307B.

As shown in FIG. 28, the slots 309A and 309B are positioned so that the arm 306A extends over the surface of a CD 305 held on the tray 301. In this position, the arm 306A inhibits disengagement of the CD from the boss 303 as it inhibits movement of the CD 305 away from the tray 1.

Preferably, the security member 306 is provided with a second arm 306C, as shown in dashed lines in FIG. 27, which extends across the CD 305 on the other side of the boss 303 to the first arm 306A. The provision of two arms extending across the CD 305 significantly increases the level of security provided by the security member as it makes it much more difficult for a potential thief to try to prise the CD 305 off the boss 303.

The head 306B of the security member may lie adjacent the opening side 308A of the box when the leg 306A is fully inserted within the box. Alternatively, a recess (not shown) may be provided in the opening side 308A of the box and the head 306B arranged to fit therein.

Preferably, as shown in FIG. 27, the head 306B of the security member is centrally located along the opening side 308A of the box.

Preferably, as shown in FIG. 28, the arm 306A of the security member lies at approximately the same height as the top of the boss 330 and does not therefore add to the overall height of the apparatus.

The arm 306A of the security member may carry a security tag 312 (of a conventional type which triggers an alarm if taken past a sensor at the exit to the store).

The security member is preferably provided with a locking device 310 which locks it in the position shown in FIGS. 27 and 28 until released by means of a special tool or key.

The locking device 310 may, for instance, comprise a latching or snap-fit device which engages with part of the tray 301 (and/or base member 302A) when the security member 306 is fully inserted so as to inhibit removal of the member 306 unless the latch is released by means of a special tool. Such a tool may, for instance, be used by staff of a retail store to release the security member when the product is sold to a customer.

The special tool may release the locking device by direct mechanical engagement therewith or may apply a magnetic force to move part of the locking device to an unlocked position. Other forms of locking device may also be used.

The locking device 310 may be located on the head 306B of the member or on part of the arm 306A adjacent the head 306B and may engage with the first portion 307A of the upstand, or a part thereof, and/or with the side 308A of the box.

Alternatively, the locking device may be located adjacent the distal end of the arm 306A of the security member and engage the second portion 307B of the upstand, or a part thereof, and/or with the hinged side 308B of the box. With the type of box shown in the drawings, this arrangement has the advantage that a space 308C between the tray 301 and the base portion 302 at the hinged side 308B of the box may be used to accommodate the locking device.

FIGS. 27 and 28 show apparatus which is similar to a conventional jewel box (except for the addition of the security member and related features) although the position of the CD 305 has been shifted by a few millimetres towards the hinged side 308B of the box to provide more room adjacent the opening side 308A for the locking device. However, if the locking device is located in the space 308C mentioned above, the position of the CD 305 may not need to be shifted in this manner.

The embodiments illustrated in FIGS. 27-29 show the security member 306 being insertable from the opening side 308A of the box. However, it would also be possible to insert it from the opposite direction, i.e. from the hinged side 308B with the head 306B lying adjacent the hinged side 308B. It could also be inserted from either of the other sides 308D, 308E of the box.

The security member 306 may be arranged so that, once the locking device 310 has been released by a member of staff, the security member 306 can be withdrawn from the tray 301 and re-used in another box. Alternatively, the security member 306 may be arranged so that once the locking device 310 has been released, it remains in the unlocked state even whilst the security member 306 remains in place. The product can thus be sold with an unlocked or de-activated security member which can subsequently be removed by the customer. In this case, the security member is likely to be discarded rather than re-used.

In the arrangement shown in FIGS. 27-29, the security member also has to pass through a slot in the opening side 308A of the base member 302. In a conventional jewel box, the lid (not shown) does not overlap the opening side 308A of the box so the security member 306 does not need to pass through the lid.

However, in a further embodiment, the box may be modified so that the security member also engages the lid so as to inhibit opening of the lid as well as inhibiting removal of the CD 305 from the tray 301. Preferably, the security member engages the lid in two positions towards opposite edges of the lid, e.g. one towards the opening side 308A of the box to inhibit opening of the lid and the other towards the hinged side 308B to inhibit removal of the lid by breakage of the pivot connection between the lid and the base member 302 (this connection being relatively weak in a conventional jewel box).

FIG. 29 shows a cross-sectional side view of such an embodiment. This is similar to the embodiment shown in FIG. 28 but shows a lid 311 provided with projections 311A and 311B having slots through which the arm 306A of the security member passes. In other arrangements, one or more of the projections 311A and 311B may be replaced by a peripheral wall of the lid at or adjacent the opening edge 308A or the hinged edge 308B of the box.

The security member may have one long arm 306A as shown and a shorter arm in the same position as the second arm 306C shown is dashed lines but only extending a short distance across the tray, e.g. up to the adjacent edge of the CD 305 but not over the CD 305. This shorter arm may pass though slots in the opening side 308A of the box, and in the upstand 307A if appropriate, to inhibit opening of the lid of the box.

In other arrangements, an upstand may be provided on the tray 301 around the periphery of the CD 305 and the security member 306 pass though slots in the upstand instead of, or in addition to, the slots in the upstands 307A and 307B at the periphery of the tray 301 or at the periphery of the box.

Although the security member preferably serves both to inhibit removal of the CD 305 from the tray 301 and inhibit opening of the lid 311 as described above, in some cases, it may be sufficient for its primary function to be to inhibit opening of the lid. This may be achieved, for example, by one or two long arms 306A and 306C extending across the box (either in the locations shown in FIG. 27 or at locations nearer to or adjacent the sides 308D, 308E of the box) each of which preferably engages the lid 311 at two points, one towards the opening side 308A of the box and one towards the hinged side 308B of the box. In this case, although the security member may still function to some extent in inhibiting disengagement of the CD 305 from the boss 303, the security of the apparatus relies more on the function of the security member to hold the lid 311 in the closed position and the re-enforcement it provides of the connection between the lid 311 and the tray 301 and/or the base portion 302.

In addition to the provision of a removable security device, it will be appreciated that the security arrangements described above also involve, in most cases, some modifications to the apparatus for holding the disk.

In the apparatus shown in FIG. 1, the slot 12 is provided in side wall 13 and slot 14 in the upstand 7. The slot 12 is preferably provided within the finger recess 15. Slots 12 and 14 are aligned with each other.

FIGS. 4, 5 and 6 show the slots 12 and 14 in more detail. These slots are sized to receive the arm 9A which is approximately 8-12 mm wide at 1.0 to 1.5 mm thick.

FIGS. 5 and 6 also show the projection 23 provided on the underside of the upstand 7. The projection 23 provides a fixed detent on the case for interacting with a movable detent on the security member. In other arrangements the positions of those fixed and movable detents may be reversed.

FIG. 6 shows the slot 24 provided in the lid portion 2. This slot is sized to receive the arm 10A which is also approximately 8-12 mm wide and 1.0 to 1.5 mm thick.

Other forms of engagement means may be provided on the lid and base portion for engaging with parts of the security member.

FIGS. 4, 5 and 6 also show a shield portion 7B projecting from the upstand 7 and which lies over the arm 18 when the security device is installed in the apparatus so as to inhibit access to the arm 18 from above the base portion 1.

FIGS. 9A-9D show apparatus in which the case is provided with detents 38 within an aperture for receiving the head 11B of a security member 8B.

FIGS. 27-29 show a jewel box which has been adapted to receive a security number 306. Slots 309A and 309B are provided in the upstand on opposite edges of the tray 301. The position of the boss 303, and hence the position of the CD 305, may be shifted by a few millimetres towards the hinged side 308B of the box. Slots (not shown) may be provided for receiving the security member from the hinged side 108B of the box or from the other sides 308D, 308E of the box. A slot is also provided in the opening side 308A of the base member 302 for the security member 306 to pass through. Projections 311A and 311B having slots through which the security device 306 passes may also be provided on the underside of the lid of the jewel box.

FIGS. 30-33 show a further embodiment of a case similar to that of FIG. 1 but with additional modifications to enhance the security thereof.

Figure 31C:
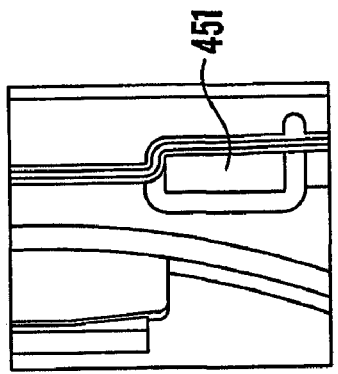
Figure 31F:
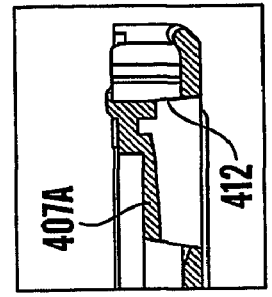
Figure 31B:
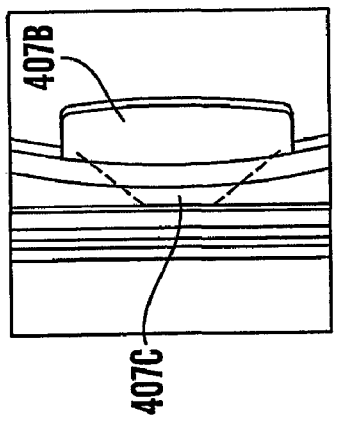

As shown in FIG. 30, the case is provided with a first shield 407A on the base portion 401 to inhibit access to the locking mechanism of a security member when the security member is installed in the case. The upper surface of base portion 401 is also angled adjacent the shield 407A to assist in leading the tip of the security member into the case as it is inserted through the slot in the upstand 407. An enlarged cross-sectional view of the first shield 407A is shown in FIG. 31F. As shown, no gap is left between the upstand 407 and the side wall 413 in the area between sockets 451 (described below) so access to the locking mechanism from above the base portion 401 is prevented so protecting it from unauthorised interference.

Figure 31E:
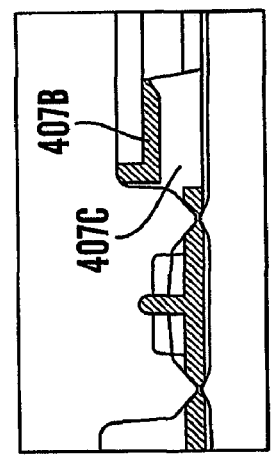

Locating means in the form of a second shield 407B is provided on the opposite side of the case adjacent the entrance to a recess 407C provided in the upstand 407 for receiving the distal end of the security member when it is installed in the case. The second shield 407B helps locate the distel end of the security member in the recess 407C and prevents the end of the security member from curling upwards or being deflected upwards towards the underside of a disk held on the apparatus (which could cause serious damage to the information recorded thereon). An enlarged plan view of the second shield 407B 1s shown in FIG. 31B and an enlarged cross-sectional view thereof is shown in FIG. 31E.

The case shown in FIGS. 30-33 is also provided with alignment pegs 450 on the lid portion 402 and alignment sockets 451 on the base portion 401. These are located on each side and adjacent to the slot 412 and 414 through the side wall 413 of the case and positions to engage with each other when the lid and base portions are in the closed position. The alignment pegs 450 and sockets 451 have parallel sides and the pegs are designed to be a close, sliding fit within the sockets. The pegs 450 have a width of about 8 mm and a length of about 4 mm. The sockets have a similar width and a depth sufficient to receive the full length of the pegs.

The alignment pegs and sockets 450, 451 serve to maintain the edge of the lid portion 402 and the edge of the base portion 401 (between the pegs), when in the closed position, parallel to each other. In particular, if an attempt is made to open the lid by prising up a corner of the lid, as shown by arrow A in FIG. 32, the forces generated by this action, which would otherwise put stress on the security member where it holds the lid and base portion 402, 401 together, are absorbed by the pegs and sockets 450, 451 and so are not transmitted to the security member.

Figure 31A:
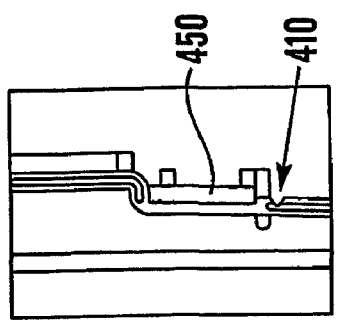
Figure 31D:
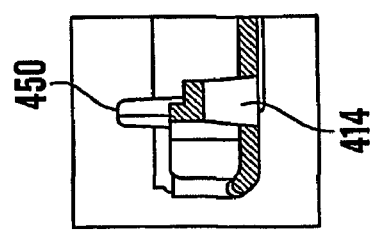

The pegs and sockets 450, 451 tend to concentrate the stress imposed by an attempt to open the lid in the manner illustrated in FIG. 30A at a point P immediately adjacent the outer edge of the relevant peg and socket pair. However, as opening the case by prising up a corner as shown in FIG. 32 is only likely to be done by someone trying to gain unauthorised access to the disk (i.e. without removing the security member), advantage can be taken of this stress concentration by building in a weakness in the lid at this point, e.g. in the form of a V-shaped notch 410 as shown in FIG. 31A. The result of this is that an attempt to open the case in this manner is more likely to result in a catastrophic, audible and highly visible failure of the lid, e.g. by propagation of a crack or fracture of the lid, e.g. along a line C such as that shown by dashed lines in FIG. 32. Not only does this still not cause failure of the security member, it makes it difficult for an attempted theft of the disk to be carried out in an inconspicuous manner as fracture of the lid is likely to draw attention to the action of the thief.

However, once the security device has been withdrawn from the apparatus, the case can be opened by gripping-the lid and base portions in the area of the finger recess 418 and pulling the lid and base portions apart. The pegs and sockets 450, 451 do not inhibit this movement and this action puts no significant level of stress on the weak point P so this weak point is not detrimental to the strength of the apparatus when opened in the intended manner, i.e. by applying forces to the lid and bas portions in the area of the finger recess 415.

FIGS. 33A and 33B show enlarged views of the finger recess 415 and the pegs 450 and sockets 451 therein.

FIGS. 34-37 illustrate apparatus for releasing a security member after it has been inserted into the disk holding apparatus.

The apparatus shown in FIGS. 34-36 comprises a slot 501 for receiving an edge of a container 502 with a security device 503 held therein by a locking device 504.

At the back of the slot, two pushing arms 505A and 505B are provided. The arms 505A, 505B extend from a flat, slidable member 506 which is resiliently biased by springs 507 to the outward position shown in FIG. 34.

A magnetic release mechanism is provided within the slot to release the locking device 504 when the container 502 is inserted in the slot 501 and to hold the security device 503 within the slot as the container 502 is withdrawn therefrom so the security device 503 is withdrawn from the container 502.

In the embodiment illustrated, the magnetic release mechanism comprises a first magnet 508 and a second magnet 509 positioned at right angles to each other.

The first magnet 508 acts to attract a spring arm 510 of the locking device 504 towards it so as to disengage the spring arm 510 from a detent 511 in the container 502 which, whilst they are engaged, prevent the security device 503 being withdrawn from the container 502.

The second magnet 509 acts to attract a head 512 of the security device 503 so as to hold the security device within the slot 501 whilst the container 502 is withdrawn therefrom. The security device 503 can then be manually removed from the slot after the container has been withdrawn.

As the spring arm 510 and head 512 are close to each other, the magnets 508 and 509 also need to be positioned close to each other. If has been found that due to interaction between the magnetic fields of the respective magnets, the first magnet 508 should be positioned partially beneath the second magnet 509 as will be explained further in relation to FIGS. 37A-37C.

FIG. 37A shows a perspective view of the magnets 508 and 509 from the front and one side. The first magnet 508 comprises two neodymium magnets each 25 mm in diameter and 10 mm in thickness. The second magnet 509 comprises three neodymium magnets each 10 mm in diameter and 4 mm in thickness. As shown in the plan view of FIG. 37B, the second magnet 509 is positioned above the first magnet 508 with the front edge of magnet 508 projecting 17 mm beyond the front surface of magnet 509 and, as shown in the front view of FIG. 37C, the second magnet 509 is positioned 4 mm above the first magnet 508.

FIG. 36A shows a cross-section on line A-A of FIG. 35 showing the container 502 as it is inserted into the slot 501. In this position, the spring arm 510 is engaged with the detent 511 so the security device 504 is locked in the container 502. As shown, the head 512 of the security device is located in a finger recess provided on the opening edge of the container 502.

FIG. 36B shows the container 502 fully inserted in the slot 501. In this position, the first magnet 508 has pulled the spring arm 510 out of the engagement with the detent 511 so the security device 504 is free to be withdrawn from the container 502. The head 512 of the security device 504 is also in engagement with the second magnet 509.

It should be noted that in moving from the position shown in FIG. 36A to that of FIG. 36B, the container is pushed in against the action of the arms 505A, 505B (which are not shown in FIGS. 36A and 36B) which engage the edge of the container either side of the finger recess. Then, once the head 512 reaches the second magnet 509, the container 502 is pushed inwards by a further, small distance, e.g. 0.5-1.0 mm, as the head 512, which has a slight arcuate shape, is flattened against the edge of the container 502. This causes the security device to be pushed further into the case, by 0.5-1.0 mm, which serves to move the tip of the spring arm 510 back from the detent 511 so it is free to be pulled down to the position shown in FIG. 36B by the magnet 508. Before this small movement occurs, engagement of the tip of the spring arm 10 with the side of the detent 511 resists this downward movement. Furthermore, once the spring arm 510 is free to move, it is pulled down sharply against the body of the security device 503 and tends to make an audible 'click' as it does so. This click may be heard by the user and provides an indication that the locking device 504 has been released.

The container 502 can then be withdrawn from the slot, as shown in FIG. 36C, leaving the security device 503 held in contact with the second magnet 509. Once the container 502 has been removed, the security device 503 can be pulled away from the magnet 509 out of the slot.

FIG. 36C also shows part 506A of the slidable member 506 which slides outwards under the action of the springs 507 to the position shown in FIG. 34 as the container is withdrawn. The part 506A is designed to slide beneath the security device 503 as shown in FIG. 36C to support the end of the security device 503 as the container 502 is withdrawn. This prevents the magnet 508 pulling the security device 503 down towards the base of the slot 501 and so distorting the device 503 (which could prevent the container 502 being withdrawn from the device 503).

Thus, to release the security device 503 from the container, the edge of the container 502 is inserted into the slot 501 until it engages the second magnet 509 at the back of the slot 1 whereupon the locking device 504 locking the security device 603 in the container 502 is automatically released. The container 502 can then be withdrawn from the slot 501 whilst the security device 503 remains held by the second magnet 509. Removal of the container 502 is partially assisted by the action of the arms 505A and 505B. The security device 503 is then pulled manually out of the slot 501 and can be re-used in another container.

It will be appreciated that with the arrangement described above, the container needs to be inserted into the slot the right way up, i.e. with the security device 503 on the side of the slot 501 provided with the magnet 508. In a further arrangement, a magnet corresponding to magnet 508 may be provided on the other side of the slot opposite magnet 508. The magnets could then be arranged so that only the magnet nearest the security device, whichever way up the container is inserted into the slot 501, acts upon the spring arm 510, the nearer the magnet being strong enough to counteract and overcome the magnetic pull of the further magnet.

In a further arrangement, electro-magnets may be used which are only activated when a container is inserted into the slot 502; insertion of the container being detected by a suitable sensor, e.g. by a light sensor.

In such an arrangement, magnets can again be provided on opposite sides of the slot so the apparatus will work irrespective of which way up the container 502 is inserted into the slot. A sensor is thus provided to sense which way up the container is so the appropriate magnet can be activated. The sensor may, for instance, sense which side of the container the security device lie adjacent or may sense which is the front and rear surface of the container, e.g. by sensing a bar-code which is typically provided on the rear face of most CD or DVD containers.

The apparatus described above may be mounted on a counter adjacent a sales till. It may also be mounted to the underside of a counter so it is less accessible and less visible to customers.

FIGS. 38 and 39 show perspective, partial views of another form of apparatus in which a security member such as that described above can be used. The apparatus comprises a base portion 601 with disk holding means 602 provided thereon. A side portion 603 can be hingedly connected to one edge of the base portion 601. The side portion 603 can be hinged between an open position shown in FIG. 38 to a closed position shown in FIG. 39 in which it holds a cover member (not shown in FIG. 39) in a closed position.

The side portion 603 and the base portion 601 are provided with slots 604A and 604B through which a security member 605 similar to that shown in FIG. 11 may be inserted. The disk holding means 602 is mounted on a support 606 and slots 606A and 606B are provided in the support for receiving the distal end of the security member 605.

A recess 603A is provided in the side portion 603 for receiving the head of the security member 605.

FIGS. 40 and 41 show cross-sectional views of the apparatus shown in FIGS. 38 and 39 in open and closed configurations, respectively. FIG. 40 shows side portion 603 open to allow a cover 607 (typically formed of cardboard) to be moved to a closed position. FIG. 41 shows the side portion 603 in the closed position to hold the cover 607 in the closed configuration. FIG. 41 also shows the security member 605.

A recess 603A is provided in the side portion 603 for receiving the head of the security member 605.

FIGS. 40 and, 41 show cross-sectional views of the apparatus shown in FIGS. 38 and 39 in open and closed configurations, respectively. FIG. 40 shows side portion 603 open to allow a cover 607 (typically formed of cardboard) to be moved to a closed position. FIG. 41 shows the side portion 603 in the closed position to hold the cover 607 in the closed configuration. FIG. 41 also shows the security member 605 inserted into the apparatus.

A long arm 605A of the member carries a locking device which locks with the base portion 601 in a similar manner to the embodiments described above. The distal end of the arm 605A passes through the support 606 but need not interact with the disk holding means 602 (in the embodiment shown, the disk holding means is a conventional rosette as used in the well-known jewel-box type of container).

A short arm 605B of the security member 605 engages a recess or slot 603B in the side portion 603 so as to prevent this being moved to the open position whilst the security member 605 is in place.

It will be appreciated that other forms of disk holding apparatus may similarly be adapted to receive a security member of the type described herein. The security member may serve to hold the apparatus closed and/or may serve to lock the disk in the apparatus by interacting with the disk holding means.

The security member may be locked in the apparatus in a similar manner to that described in relation to the other embodiments described above and may similarly carry a security tag thereon. It may also be released from the apparatus in a similar way, e.g. by means of release apparatus such as that described above.

It will be appreciated from the above that this invention can be provided in various different forms. Many of the individual features and combinations of features referred to above are believed to be novel. The invention is thus not limited to the specific combinations of features or the embodiments described but extends to cover each of the principles described or combinations thereof.

Whilst the invention has been described in relation to a disk holder of the type shown in the drawings, it will be appreciated that such disk holders can take a variety of forms and many aspects of the invention can be used with other types of disk holder.

Furthermore, as indicated in the introduction, aspects of the invention are also applicable to apparatus or case for holding other types of information storage media.

The invention claimed is:

1. Apparatus for use in holding information storage media, the apparatus comprising a case having a base portion and a lid portion moveable relative to each other between open and closed positions, and a releasable security member comprising a first projection and a second projection both extending from a head portion in a first direction, the base portion being adapted to receive the first projection and the lid portion being adapted to receive the second projection so that, when the first and second projections are respectively received by the base and lid portions, the base and lid portions are thereby held in the closed position with the head portion located adjacent an external surface of the case, the first projection comprising a flat strip which, when the first projection is received by the base portion, is inserted through an aperture in an external wall of the base portion and extends at least part way across the base portion closely adjacent and substantially parallel to an inner surface of the base portion, said strip carrying a locking device arranged to releasably retain the security member in a locked position within the case once the strip has been inserted into the base portion, said locking device carried by the strip comprising a metal component the position of which can be altered by application of a magnetic force.

2. The apparatus as recited in claim 1 comprising a holding member on the base portion for releasably holding information storage media; the releasable security member being insertable into the base portion so as to interact with the holding member to inhibit the holding member from releasing the information storage media.

3. The apparatus as recited in claim 1 in which a security tag is carried by the first projection or the second projection of the releasable security member, removal of the security tag being inhibited until withdrawal of the security member from the case.

4. The apparatus as recited in claim 1 in which the head portion of the security member fits within a recess in the exterior of the case when the first and second projections are received by the base and lid portions.

5. The apparatus as recited in claim 1 in combination with a release device arranged to provide a first magnetic force in a first direction to release the locking device and a second magnetic force in a second direction to at least partially withdraw the security member from the case.

6. Apparatus for use in holding information storage media, the apparatus comprising a case having a base portion and a lid portion moveable relative to each other between open and closed positions, and a releasable security member comprising a first projection and a second projection both extending from a head portion in a first direction, the base portion being adapted to receive the first projection and the lid portion being adapted to receive the second projection so that, when the first and second projections are respectively received by the base and lid portions, the base and lid portions are thereby held in the closed position with the head portion located adjacent an external surface of the case, the first projection comprising a flat strip which, when the first projection is received by the base portion, is inserted through an aperture in an external wall of the base portion and extends at least part way across the base portion closely adjacent and substantially parallel to an inner surface of the base portion, said strip carrying a locking device arranged to releasably retain the security member in a locked position within the case once the strip has been inserted into the base portion, wherein to release the security member from the locked position it is necessary to push the security member further into the case to allow the locking device to be released.

7. Apparatus for use in securing information storage media within a case having two spaced apart apertures therein, the apparatus comprising a releasable security member comprising a first projection and a second projection both extending from a head portion in a first direction in spaced apart parallel planes for respectively engaging the spaced apart apertures, the first projection comprising a flat strip, said strip carrying a locking device for retaining the first projection within the case once said strip has been inserted into the case, the locking device being releasable upon application of a first magnetic force in a direction perpendicular to said first direction, and the head portion being provided with a metal insert whereby a second magnetic force can be applied to the head portion in a direction parallel to said first direction to assist in withdrawing the security member from a case upon release of the locking device.

8. The apparatus as recited in claim 7 in which the locking device carried by the strip comprises a metal arm the position of which can be altered by application of a magnetic force.

9. The apparatus as recited in claim 7 in which the first projection extends further from the head portion than the second projection, the first projection having a length sufficient to carry said locking device, the second projection having not more than sufficient length to engage one of the apertures in the case.

10. The apparatus as recited in claim 7, further comprising a case having a base portion and a lid portion moveable relative to each other between open and closed positions, wherein the base portion is adapted to receive the first projection of said security member and the lid portion is adapted to receive the second projection of said security member so that, when the first and second projections are respectively received by the base and lid portions, the base and lid portions are thereby held in the closed position with the head portion located adjacent an external surface of the case, and wherein the base portion has an aperture in an external wall of the base portion that receives the flat strip of the security member such that the flat strip extends at least part way across the base portion, and wherein the locking device carried by the flat strip is arranged to retain the security member in a locked position within the case once the strip has been inserted into the base portion, and the locking device is adapted to be actuated as the first projection is inserted into the base portion to prevent withdrawal of the security member from the case until release of the locking device.

11. Apparatus for use in housing information storage media comprising a case having a base portion and a lid portion moveable relative to each other between open and closed positions, the apparatus being adapted to receive a releasable security member comprising first and second projections both extending in a first direction from a head portion in spaced apart parallel planes, the base portion being adapted to receive the first projection and the lid portion being adapted to receive the second projection so that, when the first and second projections of the security member are respectively received by the base and lid portions, the base and lid portions are thereby held in the closed position with the head portion located adjacent an external surface of the case, the base portion having a first aperture in an external wall thereof adapted to receive the first projection in the form of a flat strip closely adjacent and substantially parallel to an inner surface of the base portion, the base portion also having an engagement member for engaging a locking device carried by the flat strip once the flat strip has been inserted into the base portion so as to retain the first projection within the base portion.

12. The apparatus as recited in claim 11 in which the base portion and lid portion are joined by a hinge portion and a recess is provided in the exterior of the case at a position opposite said hinge portion, the first aperture in the base portion being located within said recess and the lid portion being adapted to receive the second projection of the security member within said recess.

13. The apparatus as recited in claim 11 in which the base and lid portions have barrier walls to inhibit access to all edges of said head portion when the head portion is located against an exterior surface of the case.

14. The apparatus as recited in claim 11 wherein the base and lid portions have inter-engageable parts adjacent said first aperture which engage each other when the lid and base portions are in the closed position for resisting relative movement therebetween in the first direction once the security member has been inserted into the case, the inter-engageable parts comprising a ridge and a groove shaped to receive the ridge.

15. Apparatus for use in housing information storage media comprising a case having a base portion and a lid portion moveable relative to each other between open and closed positions, the apparatus being adapted to receive a releasable security member comprising first and second projections both extending in a first direction from a head portion in spaced apart parallel planes, the base portion being adapted to receive the first projection and the lid portion being adapted to receive the second projection so that, when the first and second projections of the security member are respectively received by the base and lid portions, the base and lid portions are thereby held in the closed position with the head portion located adjacent an external surface of the case, the base portion having a first aperture in an external wall thereof adapted to receive the first projection in the form of a flat strip adjacent and substantially parallel to the base portion, the base portion also having an engagement member for engaging a locking device carried by the flat strip once the flat strip has been inserted into the base portion so as to retain the first projection within the base portion, the apparatus further comprising a holding member on the base portion for holding information storage media, a first slot being provided beneath the holding member for receiving the first projection, the first slot being in alignment with the first aperture.

16. The apparatus as recited in claim 15 comprising an upstand on the base portion for surrounding information storage media held in the apparatus, a second slot being provided in the upstand to allow the first projection of the security member to be inserted therethrough, the second slot being in alignment with the first slot and the first aperture.

17. Apparatus for use in housing information storage media comprising a case having a base portion and a lid portion moveable relative to each other between open and closed positions, the apparatus being adapted to receive a releasable security member comprising first and second projections both extending in a first direction from a head portion in spaced apart parallel planes, the base portion being adapted to receive the first projection and the lid portion being adapted to receive the second projection so that, when the first and second projections of the security member are respectively received by the base and lid portions, the base and lid portions are thereby held in the closed position with the head portion located adjacent an external surface of the case, the base portion having a first aperture in an external wall thereof adapted to receive the first projection in the form of a flat strip adjacent and substantially parallel to the base portion, the base portion also having an engagement member for engaging a locking device carried by the flat strip once the flat strip has been inserted into the base portion so as to retain the first projection within the base portion, wherein the security member is insertable into the case against the resistance of a resilient arm provided in the case, the resilient arm being adapted to assist in at least partially ejecting the security member from the case when the locking device is released.

18. Apparatus for use in housing information storage media comprising a case having a base portion and a lid portion moveable relative to each other between open and closed positions, the apparatus being adapted to receive a releasable security member comprising first and second projections both extending in a first direction from a head portion in spaced apart parallel planes, the base portion being adapted to receive the first projection and the lid portion being adapted to receive the second projection so that, when the first and second projections of the security member are respectively received by the base and lid portions, the base and lid portions are thereby held in the closed position with the head portion located adjacent an external surface of the case, the base portion having a first aperture in an external wall thereof adapted to receive the first projection in the form of a flat strip adjacent and substantially parallel to the base portion, the base portion also having an engagement member for engaging a locking device carried by the flat strip once the flat strip has been inserted into the base portion so as to retain the first projection within the base portion, the apparatus further comprising a releasable security member comprising a first projection and second projection both extending from a head portion in the first direction, the first projection comprising a flat strip, said strip carrying a locking device arranged to retain the security member in a locked position within the case once the strip has been inserted into the base portion, and the case further comprising a weak portion arranged such that force applied thereto causes at least one of the base and lid portions to fracture without moving the base and lid portions to the open position.

* * * * *